United States Patent
Sasaki et al.

(10) Patent No.: US 8,139,447 B2
(45) Date of Patent: Mar. 20, 2012

(54) HEAT-ASSISTED MAGNETIC RECORDING HEAD WITH NEAR-FIELD LIGHT GENERATING ELEMENT

(75) Inventors: Yoshitaka Sasaki, Milpitas, CA (US); Hiroyuki Ito, Milpitas, CA (US); Shigeki Tanemura, Milpitas, CA (US); Hironori Araki, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 286 days.

(21) Appl. No.: 12/385,447

(22) Filed: Apr. 8, 2009

(65) Prior Publication Data

US 2010/0260015 A1 Oct. 14, 2010

(51) Int. Cl.
*G11B 11/00* (2006.01)
(52) U.S. Cl. ............... 369/13.33; 369/13.13; 360/59
(58) Field of Classification Search ......... 369/13.13, 369/13.33, 13.32, 112.09, 112.14, 112.21, 369/112.27; 360/58; 385/129, 31, 88–94; 250/201.3, 201.5
See application file for complete search history.

(56) References Cited

U.S. PATENT DOCUMENTS

| 6,649,894 B2 | 11/2003 | Matsumoto et al. |
| 7,911,883 B2 | 3/2011 | Sasaki et al. |
| 8,000,175 B2 | 8/2011 | Shimazawa et al. |
| 2006/0233062 A1 | 10/2006 | Bedillion et al. |
| 2007/0165494 A1 | 7/2007 | Cho et al. |
| 2008/0002298 A1 | 1/2008 | Sluzewski |
| 2008/0055762 A1 | 3/2008 | Shimazawa et al. |
| 2010/0061200 A1* | 3/2010 | Shimazawa et al. ....... 369/13.33 |
| 2010/0073802 A1* | 3/2010 | Komura et al. .................. 360/59 |
| 2010/0118431 A1* | 5/2010 | Tomikawa et al. .............. 360/59 |
| 2010/0172220 A1* | 7/2010 | Komura et al. ............ 369/13.33 |
| 2010/0195238 A1* | 8/2010 | Shimazawa et al. ............ 360/59 |

(Continued)

FOREIGN PATENT DOCUMENTS

JP A-2003-114184 4/2003

(Continued)

OTHER PUBLICATIONS

Yoshitaka Sasaki et al., U.S. Appl. No. 12/457,984, filed Jun. 26, 2009.

(Continued)

*Primary Examiner* — Tan X Dinh
(74) *Attorney, Agent, or Firm* — Oliff & Berridge, PLC

(57) ABSTRACT

A heat-assisted magnetic recording head includes a magnetic pole, a waveguide, a near-field light generating element, and a substrate on which they are stacked. The near-field light generating element and the waveguide are disposed farther from the top surface of the substrate than is the magnetic pole. The near-field light generating element has an outer surface including: a first end face located in the medium facing surface; a second end face farther from the medium facing surface; and a coupling portion coupling the first and second end faces to each other. The first end face includes a near-field light generating part. The waveguide has an outer surface including an opposed portion opposed to a part of the coupling portion. The head further includes a mirror that reflects light emitted from a light source disposed above the waveguide, so as to let the light travel through the waveguide toward the medium facing surface.

10 Claims, 19 Drawing Sheets

U.S. PATENT DOCUMENTS

| | | | |
|---|---|---|---|
| 2010/0202081 A1* | 8/2010 | Shimazawa et al. | 360/59 |
| 2010/0238580 A1* | 9/2010 | Shimazawa et al. | 360/59 |
| 2010/0290323 A1 | 11/2010 | Isogai et al. | |
| 2010/0328806 A1* | 12/2010 | Sasaki et al. | 360/59 |
| 2011/0013497 A1* | 1/2011 | Sasaki et al. | 369/13.24 |
| 2011/0026377 A1* | 2/2011 | Shimazawa et al. | 369/13.24 |
| 2011/0058273 A1* | 3/2011 | Sasaki et al. | 360/59 |
| 2011/0096435 A1* | 4/2011 | Sasaki et al. | 360/114.01 |
| 2011/0096639 A1* | 4/2011 | Matsumoto | 369/13.33 |
| 2011/0228417 A1 | 9/2011 | Sasaki et al. | |

FOREIGN PATENT DOCUMENTS

| | | |
|---|---|---|
| JP | A-2005-4901 | 1/2005 |
| JP | A-2007-257753 | 10/2007 |
| JP | A-2008-016096 | 1/2008 |

OTHER PUBLICATIONS

Yoshitaka Sasaki et al., U.S. Appl. No. 12/458,546, filed Jul. 15, 2009.
Yoshitaka Sasaki et al., U.S. Appl. No. 12/585,150, filed Sep. 4, 2009.
Yoshitaka Sasaki et al., U.S. Appl. No. 12/714,998, filed Mar. 1, 2010.
Yoshitaka Sasaki et al., U.S. Appl. No. 12/727,666, filed Mar. 19, 2010.
Yoshitaka Sasaki et al., U.S. Appl. No. 12/727,620, filed Mar. 19, 2010.
Challener W.A., et al. "Heat-Assisted Magnetic Recording by a Near-Field Transducer with Efficient Optical Energy Transfer," Nature Photonic, Mar. 2009, pp. 1-5, Seagate Technology, Pittsburgh, PA.
Oct. 5, 2011 Office Action issued in U.S. Appl. No. 12/727,666.
Oct. 5, 2011 Office Action issued in U.S. Appl. No. 12/727,620.

* cited by examiner

HEAT-ASSISTED MAGNETIC RECORDING HEAD WITH NEAR-FIELD LIGHT GENERATING ELEMENT

BACKGROUND OF THE INVENTION

1. Field of the Invention

The present invention relates to a heat-assisted magnetic recording head for use in heat-assisted magnetic recording wherein data recording is performed with a recording medium with its coercivity lowered by irradiating the recording medium with near-field light.

2. Description of the Related Art

Recently, magnetic recording devices such as a magnetic disk drive have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a reproducing head including a magnetoresistive element (hereinafter, also referred to as MR element) for reading and a recording head including an induction-type electromagnetic transducer for writing are stacked on a substrate. In a magnetic disk drive, the thin-film magnetic head is mounted on a slider which flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data recording with existing magnetic heads.

To solve the foregoing problems, there has been proposed a method so-called heat-assisted magnetic recording. This method uses a recording medium having high coercivity. When recording data, a magnetic field and heat are simultaneously applied to the area of the recording medium where to record data, so that the area rises in temperature and drops in coercivity for data recording. The area where data is recorded subsequently falls in temperature and rises in coercivity to increase the thermal stability of magnetization.

In heat-assisted magnetic recording, heat is typically applied to the recording medium by using near-field light. A known method for generating near-field light is to irradiate a plasmon antenna, which is a small piece of metal, with laser light. The plasmon antenna has a near-field light generating part which is a sharp-pointed part for generating near-field light. The laser right applied to the plasmon antenna excites surface plasmons on the plasmon antenna. The surface plasmons propagate to the near-field light generating part of the plasmon antenna, and the near-field light generating part generates near-field light based on the surface plasmons. The near-field light generated by the plasmon antenna exists only within an area smaller than the diffraction limit of light. Irradiating the recording medium with this near-field light makes it possible to heat only a small area of the recording medium.

In conventional heat-assisted magnetic recording heads, the near-field light generating part is often disposed on the leading side with respect to a magnetic pole. An example of such heat-assisted magnetic recording heads is disclosed in JP 2007-257753 A. The leading side with respect to a reference position refers to a side closer to the air inflow end of the slider than is the reference position, and it is typically the side closer to the bottom surface of the substrate on which the reproducing head and the recording head are stacked, than is the reference position.

The heat-assisted magnetic recording head disclosed in JP 2007-257753 A is configured so that laser light emitted from a light source located outside the slider is guided to the plasmon antenna through an optical waveguide that is arranged to extend in a direction perpendicular to the medium facing surface.

The heat-assisted magnetic recording head of such configuration has the disadvantage that the optical path from the light source to the plasmon antenna is long and therefore the light suffers great loss of energy in the path.

JP 2005-4901 A discloses a heat-assisted magnetic recording head in which a light irradiation part (plasmon antenna) is provided on the trailing side with respect to the magnetic pole. The trailing side with respect to a reference position refers to a side closer to the air outflow end of the slider than is the reference position, and it is typically the side farther from the top surface of the substrate than is the reference position. According to the heat-assisted magnetic recording head described in JP 2005-4901 A, it is possible to guide light from a light source to the light irradiation part through a short path by disposing the light source on the trailing side with respect to the light irradiation part.

In the conventional heat-assisted magnetic recording heads, the plasmon antenna is directly irradiated with laser light so that the plasmon antenna converts the laser light into near-field light. This technique has the disadvantage that the use efficiency of the laser light is poor since the laser light can be reflected off the surface of the plasmon antenna or can be converted into thermal energy and absorbed into the plasmon antenna.

Conventional plasmon antennas are small in volume because their sizes are smaller than the wavelength of light. The conventional plasmon antennas therefore show a great increase in temperature when absorbing the thermal energy, which results in the problem that the plasmon antenna expands and protrudes from the medium facing surface to damage the recording medium.

OBJECT AND SUMMARY OF THE INVENTION

It is an object of the present invention to provide a heat-assisted magnetic recording head capable of improving the use efficiency of light used for the generation of near-field light.

A heat-assisted magnetic recording head according to the present invention includes: a medium facing surface that faces a recording medium; a magnetic pole that has an end face located in the medium facing surface, for producing a recording magnetic field for recording data on the recording medium; a waveguide that allows light to propagate therethrough; a near-field light generating element having a near-field light generating part located in the medium facing surface, a surface plasmon being excited based on the light propagating through the waveguide, the surface plasmon propagating to the near-field light generating part, the near-field light generating part generating near-field light based on the surface plasmon; and a substrate on which the magnetic pole, the near-field light generating element and the waveguide are stacked.

The substrate has a top surface facing toward the magnetic pole, the near-field light generating element and the waveguide. The near-field light generating element and the waveguide are disposed farther from the top surface of the substrate than is the magnetic pole. The near-field light generating element has an outer surface, the outer surface including: a first end face located in the medium facing surface; a second end face farther from the medium facing surface; and a coupling portion that couples the first end face and the second end face to each other, the first end face including the near-field light generating part. A length of the near-field light generating element in a direction perpendicular to the medium facing surface is greater than a length of the first end face in a direction perpendicular to the top surface of the substrate. The waveguide has an outer surface including an opposed portion that is opposed to a part of the coupling portion. The heat-assisted magnetic recording head further includes a mirror that reflects light emitted from a light source disposed above the waveguide, so as to let the light travel through the waveguide toward the medium facing surface.

In the heat-assisted magnetic recording head according to the present invention, the outer surface of the waveguide may have a front end face closer to the medium facing surface, a rear end face farther from the medium facing surface, and a top surface farther from the top surface of the substrate. A distance between the medium facing surface and an arbitrary point on the rear end face may increase with increasing distance between the arbitrary point and the top surface of the substrate. In this case, the mirror may be in contact with the rear end face of the waveguide, and may reflect light that enters the waveguide from the top surface of the waveguide and reaches the rear end face, so as to let the light travel toward the front end face.

The heat-assisted magnetic recording head according to the present invention may further include a laser diode as the light source, the laser diode being fixed to the waveguide and emitting the light that enters the waveguide from the top surface of the waveguide and reaches the rear end face. In this case, the heat-assisted magnetic recording head may further include a clad layer that has a refractive index lower than that of the waveguide and is interposed between the laser diode and the top surface of the waveguide.

The heat-assisted magnetic recording head according to the present invention may further include an interposition layer that has a refractive index lower than that of the waveguide and is interposed between the opposed portion of the outer surface of the waveguide and the near-field light generating element.

In the heat-assisted magnetic recording head according to the present invention, the waveguide may be disposed farther from or closer to the top surface of the substrate than is the near-field light generating element.

In the heat-assisted magnetic recording head according to the present invention, the coupling portion may include two side surfaces that decrease in distance from each other toward the top surface of the substrate.

In the heat-assisted magnetic recording head according to the present invention, the first end face may have a triangular shape or a V shape.

In the heat-assisted magnetic recording head according to the present invention, the opposed portion of the outer surface of the waveguide is opposed to a part of the coupling portion of the outer surface of the near-field light generating element. In the near-field light generating element, surface plasmons are excited based on the light propagating through the waveguide, and the surface plasmons propagate to the near-field light generating part. The near-field light generating part generates near-field light based on the surface plasmons. Consequently, according to the present invention, it is possible to increase the efficiency of conversion of the light propagating through the waveguide into near-field light. Moreover, in the heat-assisted magnetic recording head according to the present invention, the near-field light generating element and the waveguide are disposed farther from the top surface of the substrate than is the magnetic pole, and the light emitted from the light source disposed above the waveguide is reflected by the mirror so as to travel through the waveguide toward the medium facing surface. According to the present invention, it is thus possible to guide the light from the light source to the opposed portion of the outer surface of the waveguide through a short path. Consequently, according to the present invention, it is possible to increase the use efficiency of the light used for the generation of near-field light.

Other and further objects, features and advantages of the present invention will appear more fully from the following description.

DETAILED DESCRIPTION OF THE PREFERRED EMBODIMENTS

First Embodiment

Figure 6:
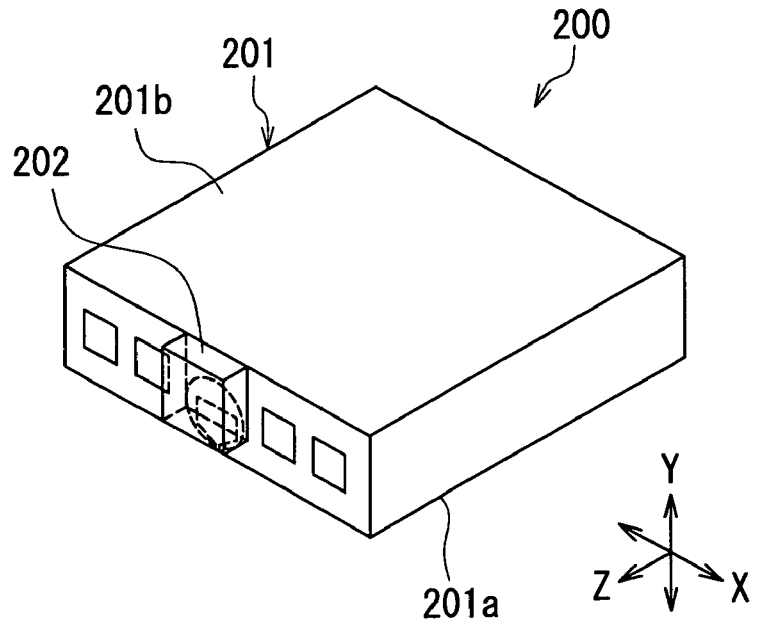
FIG. 6 is a perspective view of a slider including the heat-assisted magnetic recording head of FIG. 1.

Preferred embodiments of the present invention will now be described in detail with reference to the drawings. Reference is first made to FIG. 6 to describe a magnetic disk drive and a slider including a heat-assisted magnetic recording head according to a first embodiment of the present invention. FIG. 6 is a perspective view of the slider including the heat-assisted magnetic recording head according to the present embodiment.

The magnetic disk drive of the present embodiment incorporates the slider 200 including the heat-assisted magnetic recording head according to the present embodiment. The slider 200 is supported by a suspension (not shown) and is disposed to face a circular-plate-shaped recording medium (magnetic disk) that is driven to rotate. In FIG. 6 the X direction is a direction across the tracks of the recording medium, the Y direction is a direction perpendicular to the surface of the recording medium, and the Z direction is the direction of travel of the recording medium as seen from the slider 200. The X direction, the Y direction and the Z direction are orthogonal to one another.

The slider 200 includes a slider main body 201, and a laser diode 202 as a light source joined to the slider main body 201. The slider main body 201 is nearly hexahedron-shaped and has a medium facing surface 201a that faces the recording medium, and a rear surface 201b opposite to the medium facing surface 201a.

When the recording medium rotates and travels in the Z direction, an airflow passing between the recording medium and the slider main body 201 generates a lift on the upper side in the Y direction of FIG. 6, and the lift is exerted on the slider main body 201. The lift causes the slider main body 201 to slightly fly over the surface of the recording medium.

Figure 1:
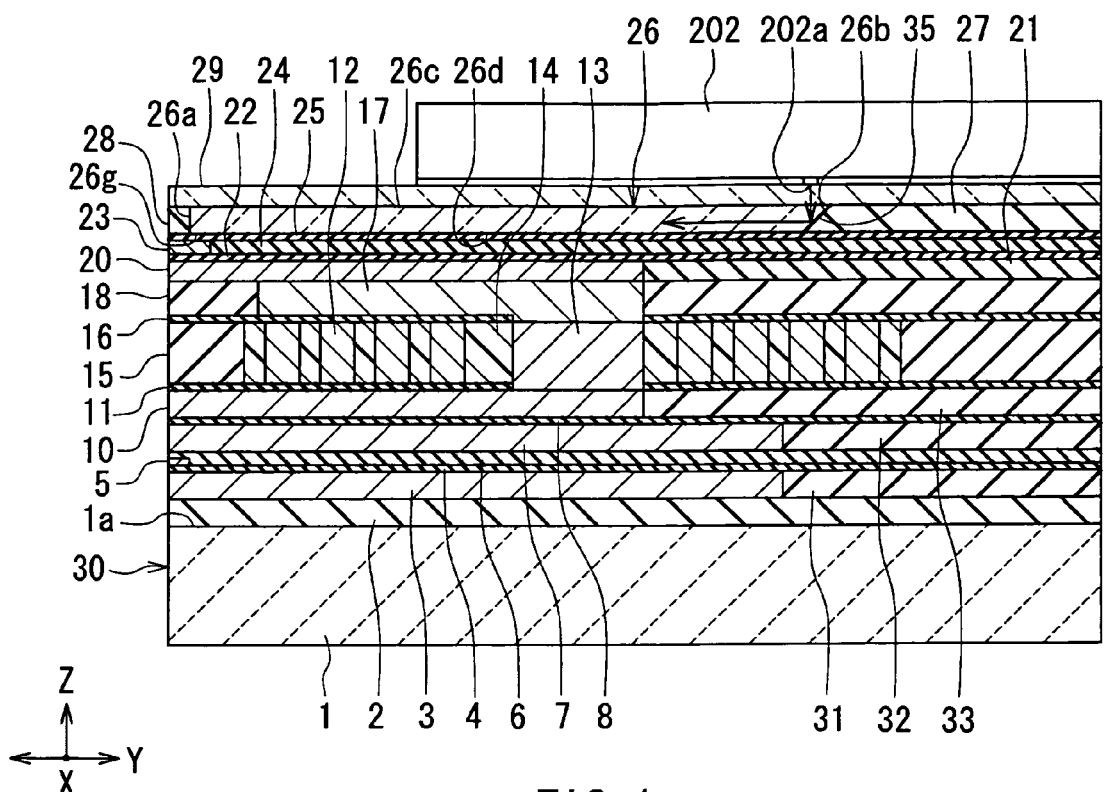
FIG. 1 is a cross-sectional view showing the configuration of a heat-assisted magnetic recording head according to a first embodiment of the present invention.
Figure 2:
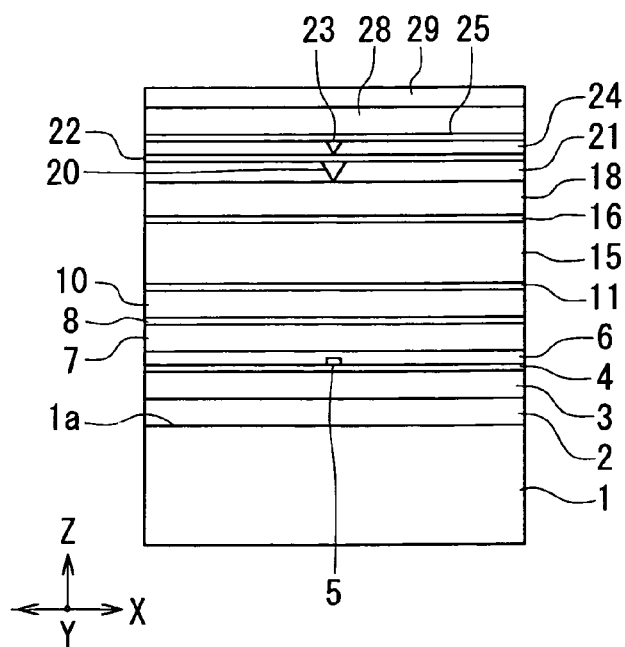
FIG. 2 is a front view showing the medium facing surface of the heat-assisted magnetic recording head of FIG. 1.
Figure 3:
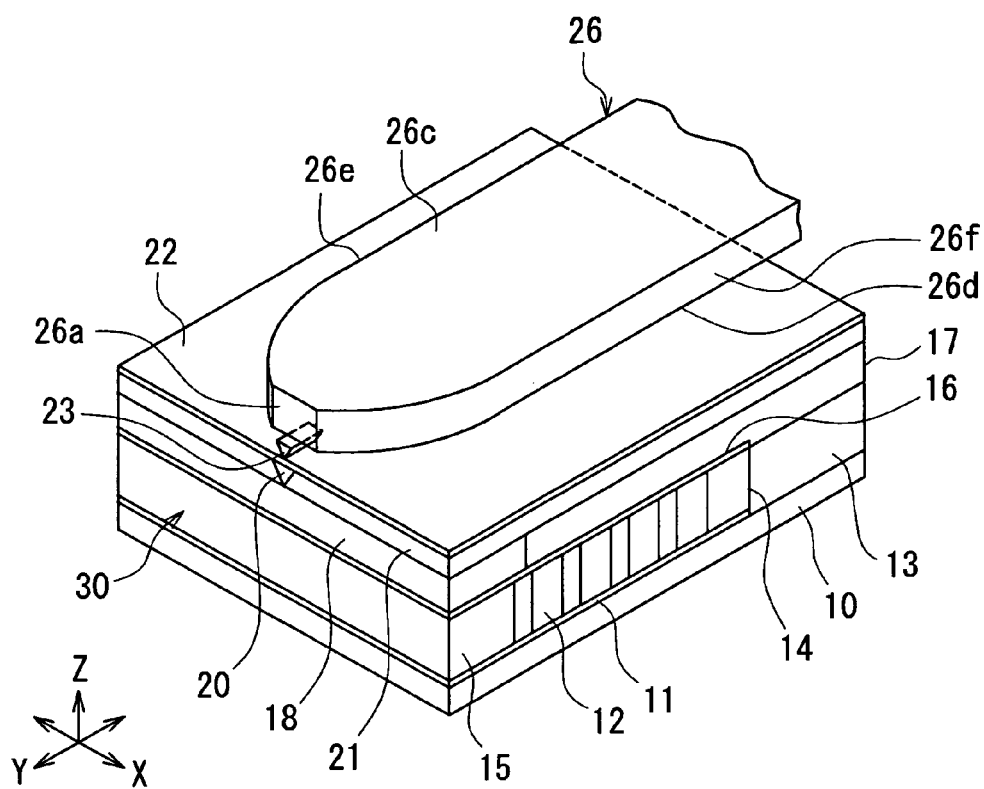
FIG. 3 is a perspective view showing the main part of the heat-assisted magnetic recording head of FIG. 1.
Figure 4:
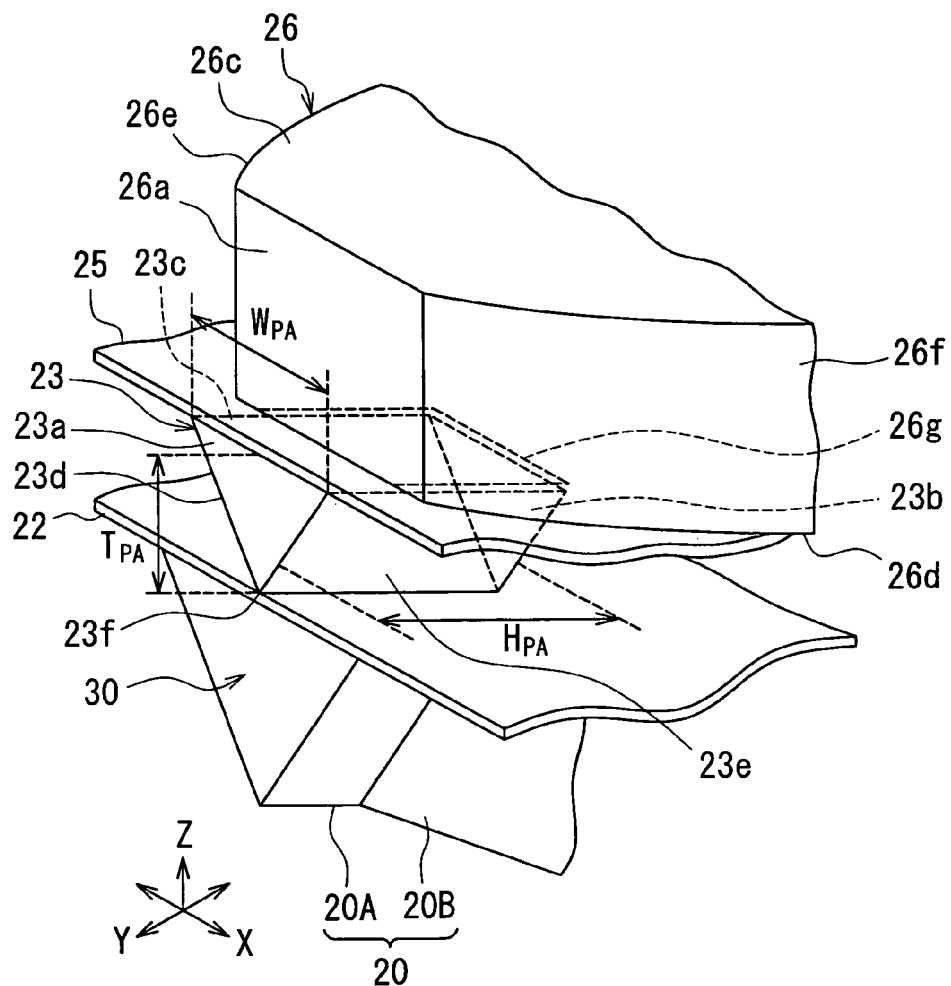
FIG. 4 is a perspective view showing the neighborhood of a near-field light generating element of the heat-assisted magnetic recording head of FIG. 1.
Figure 5:
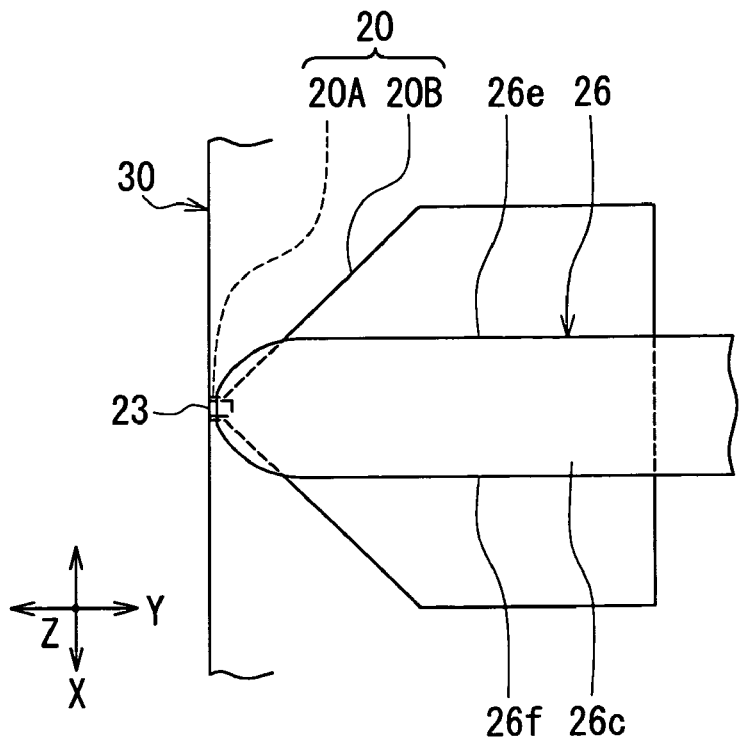
FIG. 5 is a plan view showing a magnetic pole, the near-field light generating element and a waveguide of the heat-assisted magnetic recording head of FIG. 1.

Reference is now made to FIG. 1 to FIG. 5 to describe the configuration of the heat-assisted magnetic recording head according to the present embodiment. FIG. 1 is a cross-sectional view showing the configuration of the heat-assisted magnetic recording head according to the present embodiment. FIG. 2 is a front view showing the medium facing surface of the heat-assisted magnetic recording head of FIG. 1. FIG. 3 is a perspective view showing the main part of the heat-assisted magnetic recording head of FIG. 1. FIG. 4 is a perspective view showing the neighborhood of a near-field light generating element of the heat-assisted magnetic recording head of FIG. 1. FIG. 5 is a plan view showing a magnetic pole, the near-field light generating element and a waveguide of the heat-assisted magnetic recording head of FIG. 1. FIG. 1 shows a cross section perpendicular to the medium facing surface and the top surface of the substrate. The X, Y and Z directions shown in FIG. 6 are also shown in FIG. 1 to FIG. 5. In FIG. 1 the X direction is orthogonal to the Y and Z directions. In FIG. 2 the Y direction is orthogonal to the X and Z directions. In FIG. 5 the Z direction is orthogonal to the X and Y directions. A track width direction is the same as the X direction.

As shown in FIG. 1 and FIG. 2, the heat-assisted magnetic recording head according to the present embodiment has a medium facing surface 30 that faces the recording medium. The heat-assisted magnetic recording head includes: a substrate 1 made of a ceramic material such as aluminum oxide-titanium carbide ($Al_2O_3$—TiC) and having a top surface 1a; an insulating layer 2 made of an insulating material and disposed on the top surface 1a of the substrate 1; a bottom shield layer 3 made of a magnetic material and disposed on the insulating layer 2; and an insulating layer 31 made of an insulating material and disposed around the bottom shield layer 3 on the insulating layer 2. The insulating layers 2 and 31 are made of alumina ($Al_2O_3$), for example. The bottom shield layer 3 and the insulating layer 31 are flattened at the top.

The heat-assisted magnetic recording head further includes: a bottom shield gap film 4 which is an insulating film disposed over the top surfaces of the bottom shield layer 3 and the insulating layer 31; a magnetoresistive (MR) element 5 as a read element disposed on the bottom shield gap film 4; a top shield gap film 6 which is an insulating film disposed on the MR element 5; a top shield layer 7 made of a magnetic material and disposed on the top shield gap film 6; and an insulating layer 32 made of an insulating material and disposed around the top shield layer 7 on the top shield gap film 6. The insulating layer 32 is made of alumina, for example. The top shield layer 7 and the insulating layer 32 are flattened at the top.

An end of the MR element 5 is located in the medium facing surface 30 that faces the recording medium. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction nearly parallel to the plane of layers constituting the GMR element or the current-perpendicular-to-plane (CPP) type in which the current used for detecting magnetic signals is fed in a direction nearly perpendicular to the plane of layers constituting the GMR element. The portions from the bottom shield layer 3 to the top shield layer 7 constitute a reproducing head.

The heat-assisted magnetic recording head further includes: a nonmagnetic layer 8 made of a nonmagnetic material and disposed over the top surfaces of the top shield layer 7 and the insulating layer 32; a return magnetic pole layer 10 made of a magnetic material and disposed on the nonmagnetic layer 8; and an insulating layer 33 made of an insulating material and disposed around the return magnetic pole layer 10 on the nonmagnetic layer 8. The nonmagnetic layer 8 and the insulating layer 33 are made of alumina, for example. The return magnetic pole layer 10 and the insulating layer 33 are flattened at the top.

The heat-assisted magnetic recording head further includes: an insulating layer 11 disposed on part of the top surfaces of the return magnetic pole layer 10 and the insulating layer 33; a coil 12 disposed on the insulating layer 11; and a coupling layer 13 disposed on the return magnetic pole layer 10. The return magnetic pole layer 10 and the coupling layer 13 are each made of a magnetic material. The material of the return magnetic pole layer 10 and the coupling layer 13 may be CoFeN, CoNiFe, NiFe or CoFe, for example. The insulating layer 11 is made of alumina, for example. The coil 12 produces a magnetic field corresponding to data to be recorded on the recording medium. The coil 12 is planar spiral-shaped and wound around the coupling layer 13. The coil 12 is made of a conductive material such as copper.

The heat-assisted magnetic recording head further includes: an insulating layer 14 made of an insulating material and disposed around the coil 12 and in the space between every adjacent turns of the coil 12; an insulating layer 15 disposed around the insulating layer 14 and the coupling layer 13 on the insulating layer 11; and an insulating layer 16 disposed on the coil 12 and the insulating layers 14 and 15. The coil 12, the coupling layer 13 and the insulating layers 14 and 15 are flattened at the top. The insulating layer 14 is made of photoresist, for example. The insulating layers 15 and 16 are made of alumina, for example.

The heat-assisted magnetic recording head further includes: a bottom yoke layer 17 made of a magnetic material and disposed over the coupling layer 13 and the insulating layer 16; and a nonmagnetic layer 18 made of a nonmagnetic material and disposed around the bottom yoke layer 17 on the insulating layer 16. The material of the bottom yoke layer 17 may be CoFeN, CoNiFe, NiFe or CoFe, for example. The nonmagnetic layer 18 is made of alumina, for example. The bottom yoke layer 17 has an end face that is closer to the medium facing surface 30, and this end face is located at a distance from the medium facing surface 30. The bottom yoke layer 17 and the nonmagnetic layer 18 are flattened at the top.

The heat-assisted magnetic recording head further includes: a magnetic pole 20 disposed over the bottom yoke layer 17 and the nonmagnetic layer 18; and a nonmagnetic layer 21 made of a nonmagnetic material and disposed around the magnetic pole 20 on the nonmagnetic layer 18. The magnetic pole 20 has an end face located in the medium facing surface 30. The magnetic pole 20 passes a magnetic flux corresponding to the magnetic field produced by the coil 12, and produces a recording magnetic field for recording data on the recording medium by means of a perpendicular magnetic recording system. The magnetic pole 20 is made of a magnetic metal material. The material of the magnetic pole 20 may be NiFe, CoNiFe or CoFe, for example. The nonmagnetic layer 21 is made of alumina, for example. The magnetic pole 20 and the nonmagnetic layer 21 are flattened at the top.

As shown in FIG. 4 and FIG. 5, the magnetic pole 20 includes a track width defining portion 20A and a wide portion 20B. The track width defining portion 20A has an end face located in the medium facing surface 30 and an end opposite thereto. The wide portion 20B is connected to the end of the track width defining portion 20A and has a width greater than that of the track width defining portion 20A. The width of the track width defining portion 20A does not change with the distance from the medium facing surface 30. For example, the wide portion 20B is equal in width to the track width defining portion 20A at the boundary with the track width defining portion 20A, and gradually increases in width with increasing distance from the medium facing surface 30 and then maintains a specific width to the end of the wide portion 20B. In the example shown in FIG. 2 to FIG. 4, the end face of the track width defining portion 20A located in the medium facing surface 30 is shaped like an isosceles triangle with its vertex downward. However, the end face of the track width defining portion 20A located in the medium facing surface 30 may have a rectangular or trapezoidal shape.

The heat-assisted magnetic recording head further includes an insulating layer 22 disposed over the top surfaces of the magnetic pole 20 and the nonmagnetic layer 21. The insulating layer 22 is made of alumina, for example. The insulating layer 22 has a thickness within the range of 30 to 70 nm, for example.

The heat-assisted magnetic recording head further includes: a near-field light generating element 23 disposed on the insulating layer 22; and an insulating layer 24 made of an insulating material and disposed around the near-field light generating element 23 on the insulating layer 22. The near-field light generating element 23 and the insulating layer 24 are flattened at the top. The near-field light generating element 23 is made of a metal. Specifically, the near-field light generating element 23 is made of one of Au, Ag, Al, Cu, Pd, Pt, Rh and Ir, or of an alloy composed of two or more of the above-listed elements. The insulating layer 24 is made of alumina, for example.

As shown in FIG. 4, the near-field light generating element 23 has a near-field light generating part 23f located in the medium facing surface 30. The near-field light generating element 23 is shaped like a triangular prism, having an outer surface described below. The outer surface of the near-field light generating element 23 includes: a first end face 23a located in the medium facing surface 30; a second end face 23b farther from the medium facing surface 30; and a coupling portion that couples the first end face 23a and the second end face 23b to each other. The coupling portion includes a top surface 23c farther from the top surface 1a of the substrate 1, and two side surfaces 23d and 23e that decrease in distance from each other toward the top surface 1a of the substrate 1. The first end face 23a is shaped like an isosceles triangle with the vertex downward. The first end face 23a includes the near-field light generating part 23f. Specifically, the near-field light generating part 23f refers to the downward vertex of the end face 23a and its vicinity.

As shown in FIG. 4, the length of the near-field light generating element 23 in the direction perpendicular to the medium facing surface 30 will be denoted by the symbol $H_{PA}$; the width of the first end face 23a at its top edge will be denoted by the symbol $W_{PA}$; and the length of the first end face 23a in the direction perpendicular to the top surface 1a of the substrate 1 will be denoted by the symbol $T_{PA}$. The length $H_{PA}$ of the near-field light generating element 23 in the direction perpendicular to the medium facing surface 30 is greater than the length $T_{PA}$ of the first end face 23a in the direction perpendicular to the top surface 1a of the substrate 1. Both of $W_{PA}$ and $T_{PA}$ are smaller than or equal to the wavelength of light propagating through a waveguide to be described later. $W_{PA}$ falls within the range of 50 to 150 nm, for example. $T_{PA}$ falls within the range of 50 to 150 nm, for example. $H_{PA}$ falls within the range of 0.25 to 2.5 μm, for example.

The heat-assisted magnetic recording head further includes: an interposition layer 25 disposed over the top surfaces of the near-field light generating element 23 and the insulating layer 24; and a waveguide 26 and clad layers 27 and 28 disposed on the interposition layer 25. The waveguide 26 is made of a dielectric material that transmits laser light to be described later. The interposition layer 25 is made of a dielectric material that has a refractive index lower than that of the waveguide 26 and transmits the laser light. The clad layers 27 and 28 are made of a dielectric material that has a refractive index lower than that of the waveguide 26. For example, the waveguide 26 may be made of $Ta_2O_5$ which has a refractive index of approximately 2.1, and the interposition layer 25 and the clad layers 27 and 28 may be made of alumina which has a refractive index of approximately 1.8. The interposition layer 25 has a thickness within the range of 30 to 70 nm, for example.

As shown in FIG. 1, FIG. 3 and FIG. 5, the waveguide 26 extends in the direction perpendicular to the medium facing surface 30 (the Y direction). The waveguide 26 has an outer surface. The outer surface has: a front end face 26a closer to the medium facing surface 30; a rear end face 26b farther from the medium facing surface 30; a top surface 26c farther from the top surface 1a of the substrate 1; a bottom surface 26d closer to the top surface 1a of the substrate 1; and two side surfaces 26e and 26f that are opposite to each other in the track width direction. FIG. 1 shows an example in which the front end face 26a is located away from the medium facing surface 30. The front end face 26a may be located in the medium facing surface 30, however. The clad layer 27 is located farther from the medium facing surface 30 than is the rear end face 26b. The clad layer 28 is arranged around the waveguide 26 and the clad layer 27. The waveguide 26 and the clad layers 27 and 28 are flattened at the top.

The outer surface of the waveguide 26 includes an opposed portion 26g that is opposed to a part of the coupling portion of the outer surface of the near-field light generating element 23. In the present embodiment, as shown in FIG. 1, the waveguide 26 is disposed farther from the top surface 1a of the substrate 1 than is the near-field light generating element 23, and a part of the bottom surface 26d of the waveguide 26 is opposed to a part of the top surface 23c of the near-field light generating element 23 with the interposition layer 25 interposed therebetween. This part of the bottom surface 26d of the waveguide 26 opposed to the part of the top surface 23c is the opposed portion 26g. The previously-mentioned configuration that the length $H_{P4}$ of the near-field light generating element 23 in the direction perpendicular to the medium facing surface 30 is greater than the length $T_{P4}$ of the first end face 23a in the direction perpendicular to the top surface 1a of the substrate 1 is necessary in order that the opposed portion 26g, which is a part of the bottom surface 26d of the waveguide 26, is opposed to a part of the top surface 23c of the near-field light generating element 23 with the interposition layer 25 interposed therebetween.

As shown in FIG. 1, the rear end face 26b is an oblique surface inclined at an angle of 45° with respect to the direction perpendicular to the top surface 1a of the substrate 1. The distance between the medium facing surface 30 and an arbitrary point on the rear end face 26b increases with increasing distance between the arbitrary point and the top surface 1a of the substrate 1.

The heat-assisted magnetic recording head further includes a mirror 35 disposed between the waveguide 26 and the clad layer 27 so as to be in contact with the rear end face 26b of the waveguide 26. The mirror 35 is made of a film of a metal such as Cu or Au having a thickness of 50 to 200 nm or so. The mirror 35 is configured to reflect light emitted from the light source disposed above the waveguide 26, so as to let the light travel through the waveguide 26 toward the medium facing surface 30. More specifically, the mirror 35 is configured to reflect light that enters the waveguide 26 from the top surface 26c of the waveguide 26 and reaches the rear end face 26b, so as to let the light travel toward the front end face 26a.

The heat-assisted magnetic recording head further includes a clad layer 29 disposed over the top surfaces of the waveguide 26 and the clad layers 27 and 28. The clad layer 29 is made of a dielectric material that has a refractive index lower than that of the waveguide 26 and transmits laser light. For example, if the waveguide 26 is made of $Ta_2O_5$ which has a refractive index of approximately 2.1, the clad layer 29 may be made of alumina which has a refractive index of approximately 1.8. The clad layer 29 has a thickness in the range of 0.1 to 0.5 μm, for example.

The heat-assisted magnetic recording head further includes a laser diode 202 fixed to the top surface of the clad layer 29 with an adhesive that transmits laser light, for example. The portions from the return magnetic pole layer 10 to the laser diode 202 constitute a recording head. In the present embodiment, the laser diode 202 is disposed above the waveguide 26 and is fixed to the waveguide 26 with the clad layer 29 interposed therebetween. The laser diode 202 has an emission part 202a on its bottom surface, and emits laser light downward from the emission part 202a. The laser light emitted from the emission part 202a passes through the clad layer 29, enters the waveguide 26 from the top surface 26c and reaches the rear end face 26b, where the laser light is reflected by the mirror 35 so as to travel through the waveguide 26 toward the medium facing surface 30 (the front end face 26a).

FIG. 3 and FIG. 5 show an example of the configuration of the waveguide 26. In this example, the two side surfaces 26e and 26f of the waveguide 26 are formed as a reflecting surface of parabolic shape in the vicinity of the front end face 26a as viewed from above. The reflecting surface has the function of collecting the light propagating through the waveguide 26 to the vicinity of the front end face 26a.

As has been described, the heat-assisted magnetic recording head according to the present embodiment has the medium facing surface 30 that faces the recording medium, the reproducing head, and the recording head. The reproducing head and the recording head are stacked on the substrate 1. The recording head is disposed forward of the reproducing head along the direction of travel of the recording medium (the Z direction) (in other words, disposed on the trailing side).

The reproducing head includes: the MR element 5 as the read element; the bottom shield layer 3 and the top shield layer 7 for shielding the MR element 5, the respective portions of the bottom shield layer 3 and the top shield layer 7 located near the medium facing surface 30 being opposed to each other with the MR element 5 therebetween; the bottom shield gap film 4 disposed between the MR element 5 and the bottom shield layer 3; and the top shield gap film 6 disposed between the MR element 5 and the top shield layer 7.

The recording head includes the return magnetic pole layer 10, the coil 12, the coupling layer 13, the bottom yoke layer 17, and the magnetic pole 20. The coil 12 produces a magnetic field corresponding to data to be recorded on the recording medium. The return magnetic pole layer 10, the coupling layer 13, the bottom yoke layer 17 and the magnetic pole 20 form a magnetic path for passing a magnetic flux corresponding to the magnetic field produced by the coil 12. The magnetic pole 20 allows the magnetic flux corresponding to the magnetic field produced by the coil 12 to pass and produces a recording magnetic field for recording data on the recording medium by means of the perpendicular magnetic recording system. The position of the end of a bit pattern to be recorded on the recording medium depends on the position of the top edge, i.e., the edge farther from the top surface 1a of the substrate 1, of the end face of the magnetic pole 20 located in the medium facing surface 30. The width of the end face of the magnetic pole 20 located in the medium facing surface 30 taken at the top edge defines the track width. The return magnetic pole layer 10, the coupling layer 13 and the bottom yoke layer 17 have the function of returning a magnetic flux to the magnetic pole 20, the magnetic flux having been generated from the magnetic pole 20 and having magnetized the recording medium.

The recording head further includes the near-field light generating element 23, the interposition layer 25, the waveguide 26, the clad layers 27, 28 and 29, the mirror 35, and the laser diode 202. The top surface 1a of the substrate 1 faces toward the magnetic pole 20, the near-field light generating element 23 and the waveguide 26. The near-field light generating element 23 and the waveguide 26 are disposed farther from the top surface 1a of the substrate 1 than is the magnetic pole 20.

The outer surface of the near-field light generating element 23 includes: the first end face 23a located in the medium facing surface 30; the second end face 23b farther from the medium facing surface 30; and the coupling portion that couples the first end face 23a and the second end face 23b to each other. The coupling portion includes: the top surface 23c farther from the top surface 1a of the substrate 1; and the two side surfaces 23d and 23e that decrease in distance from each other toward the top surface 1a of the substrate 1. The first end face 23a includes the near-field light generating part 23f. The length $H_{PA}$ of the near-field light generating element 23 in the direction perpendicular to the medium facing surface 30 (the Y direction) is greater than the length $T_{PA}$ of the first end face 23a in the direction perpendicular to the top surface 1a of the substrate 1. As will be detailed later, surface plasmons are excited on the near-field light generating element 23 based on the light propagating through the waveguide 26. The surface plasmons propagate to the near-field light generating part 23f, and the near-field light generating part 23f generates near-field light based on the surface plasmons.

The waveguide 26 is disposed farther from the top surface 1a of the substrate 1 than is the near-field light generating element 23. The outer surface of the waveguide 26 includes the opposed portion 26g that is opposed to a part of the top surface 23c of the near-field light generating element 23 with the interposition layer 25 interposed therebetween.

Each of the interposition layer 25 and the clad layers 27, 28 and 29 is made of a dielectric material having a refractive index lower than that of the waveguide 26. Consequently, the outer surface of the waveguide 26 excluding the rear end face 26b is covered with the dielectric material that is lower in refractive index than the waveguide 26.

The laser diode 202 is disposed above the waveguide 26 and is fixed to the waveguide 26 with the clad layer 29 interposed therebetween. The laser diode 202 emits linearly polarized laser light. The mirror 35 is arranged to be in contact with the rear end face 26b of the waveguide 26. The mirror 35 reflects the laser light emitted from the laser diode 202 so as to let the laser light travel through the waveguide 26 toward the medium facing surface 30. Note that the laser diode 202 is arranged so that the electric field of the laser light propagating through the waveguide 26 oscillates in a direction perpendicular to the opposed portion 26g (the bottom surface 26d).

Now, the principle of generation of near-field light according to the present embodiment and the principle of heat-assisted magnetic recording using the near-field light will be described in detail. The laser light emitted from the laser diode 202 passes through the clad layer 29, enters the waveguide 26 from the top surface 26c and reaches the rear end face 26b, where the laser light is reflected by the mirror 35 so as to travel through the waveguide 26 toward the medium facing surface 30 (the front end face 26a). This laser light propagates through the waveguide 26 to reach the vicinity of the opposed portion 26g. The laser light is then totally reflected at the interface between the opposed portion 26g and the interposition layer 25, and this generates evanescent light permeating into the interposition layer 25. As a result, the evanescent light and the collective oscillations of charges on the top surface 23c of the near-field light generating element 23, i.e., surface plasmons, are coupled with each other to excite a system of surface plasmon polaritons. In this way, surface plasmons are excited on the near-field light generating element 23.

The surface plasmons excited on the near-field light generating element 23 propagate along the top surface 23c and the first end face 23a of the near-field light generating element 23 toward the near-field light generating part 23f. Consequently, the surface plasmons concentrate on the near-field light generating part 23f, and the near-field light generating part 23f generates near-field light based on the surface plasmons. The near-field light is projected toward the recording medium, reaches the surface of the recording medium and heats a part of the magnetic recording layer of the recording medium. This lowers the coercivity of the part of the magnetic recording layer. In heat-assisted magnetic recording, the part of the magnetic recording layer with the lowered coercivity is subjected to a recording magnetic field produced by the magnetic pole 20 for data recording.

Reference is now made to FIG. 7A to FIG. 16A and FIG. 7B to FIG. 16B to describe a method of manufacturing the heat-assisted magnetic recording head according to the present embodiment. FIG. 7A to FIG. 16A each show a cross section of a stack of layers formed in the process of manufacturing the heat-assisted magnetic recording head, the cross section being perpendicular to the medium facing surface and the substrate. In FIG. 7A to FIG. 16A the symbol "ABS" indicates the position where the medium facing surface 30 is to be formed. FIG. 7B to FIG. 16B show cross sections at the position ABS of FIG. 7A to FIG. 16A, respectively.

Figure 7A:
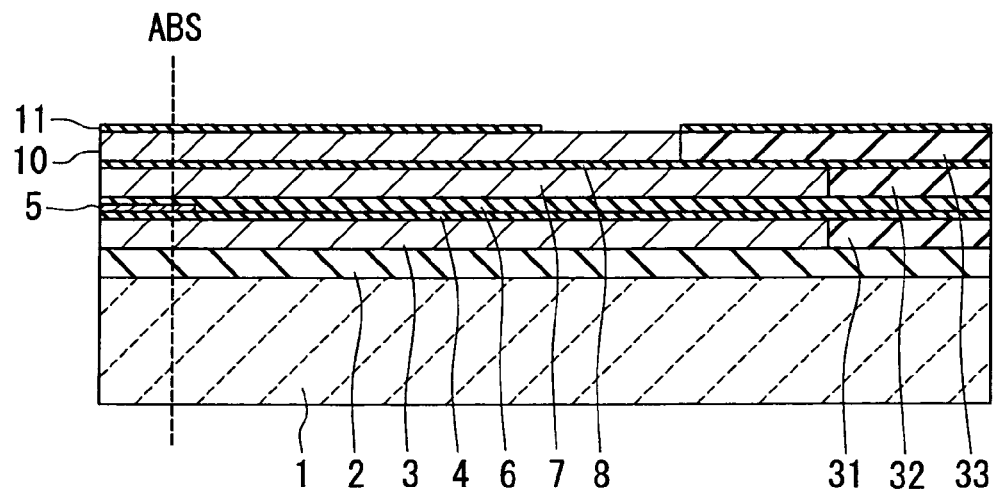
FIG. 7A and FIG. 7B are explanatory diagrams showing a step of a method of manufacturing the heat-assisted magnetic recording head according to the first embodiment of the present invention.
Figure 7B:
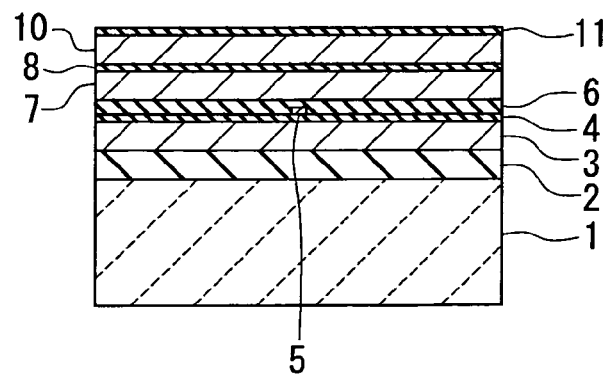

In the method of manufacturing the magnetic head according to the present embodiment, first, the insulating layer 2 is formed on the substrate 1 as shown in FIG. 7A and FIG. 7B. Next, the bottom shield layer 3 is formed on the insulating layer 2. Next, the insulating layer 31 is formed to cover the bottom shield layer 3. Next, the insulating layer 31 is polished by, for example, chemical mechanical polishing (hereinafter referred to as CMP) until the bottom shield layer 3 is exposed, whereby the bottom shield layer 3 and the insulating layer 31 are flattened at the top. Next, the bottom shield gap film 4 is formed over the bottom shield layer 3 and the insulating layer 31. Next, the MR element 5 and leads (not shown) connected to the MR element 5 are formed on the bottom shield gap film 4. Next, the top shield gap film 6 is formed to cover the MR element 5 and the leads. Next, the top shield layer 7 is formed on the top shield gap film 6. Next, the insulating layer 32 is formed to cover the top shield layer 7. Next, the insulating layer 32 is polished by, for example, CMP until the top shield layer 7 is exposed, whereby the top shield layer 7 and the insulating layer 32 are flattened at the top. Next, the nonmagnetic layer 8 is formed over the top shield layer 7 and the insulating layer 32. Next, the return magnetic pole layer 10 is formed on the nonmagnetic layer 8. Next, the insulating layer 33 is formed to cover the return magnetic pole layer 10. Next, the insulating layer 33 is polished by, for example, CMP until the return magnetic pole layer 10 is exposed, whereby the return magnetic pole layer 10 and the insulating layer 33 are flattened at the top. Next, the insulating layer 11 is formed on part of the top surfaces of the return magnetic pole layer 10 and the insulating layer 33.

Figure 8A:
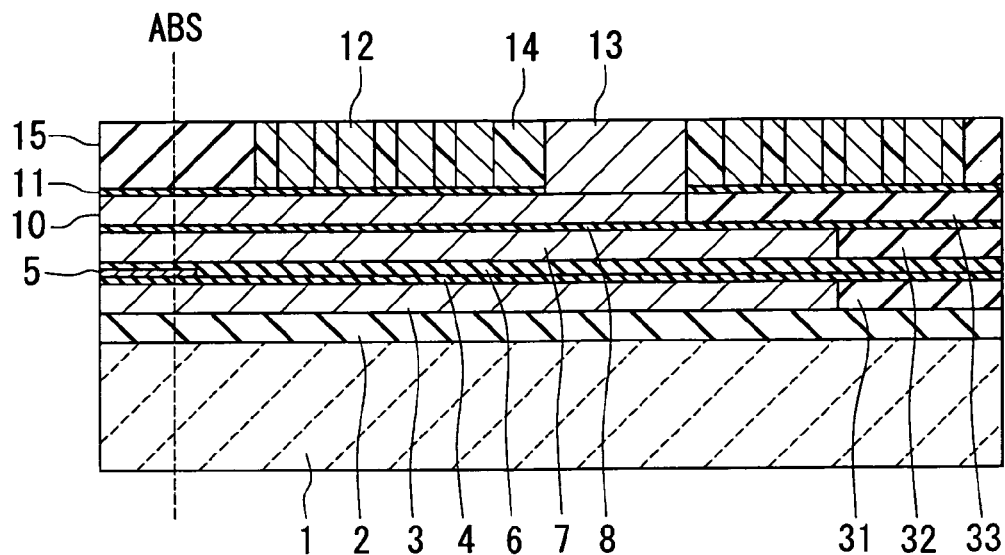
FIG. 8A and FIG. 8B are explanatory diagrams showing a step that follows the step of FIG. 7A and FIG. 7B.
Figure 8B:
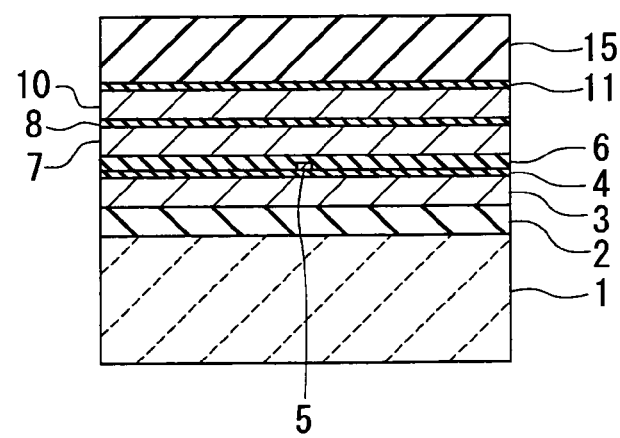

FIG. 8A and FIG. 8B show the next step. In this step, first, the coil 12 is formed on the insulating layer 11 by, for example, frame plating. Next, the coupling layer 13 is formed on the return magnetic pole layer 10 by, for example, frame plating. Alternatively, the coil 12 may be formed after forming the coupling layer 13. Next, the insulating layer 14 made of photoresist, for example, is selectively formed around the coil 12 and in the space between every adjacent turns of the coil 12. Next, the insulating layer 15 is formed over the entire top surface of the stack by, for example, sputtering. Next, the insulating layer 15 is polished by, for example, CMP until the coil 12 and the coupling layer 13 are exposed, whereby the coil 12, the coupling layer 13 and the insulating layers 14 and 15 are flattened at the top.

Figure 9A:
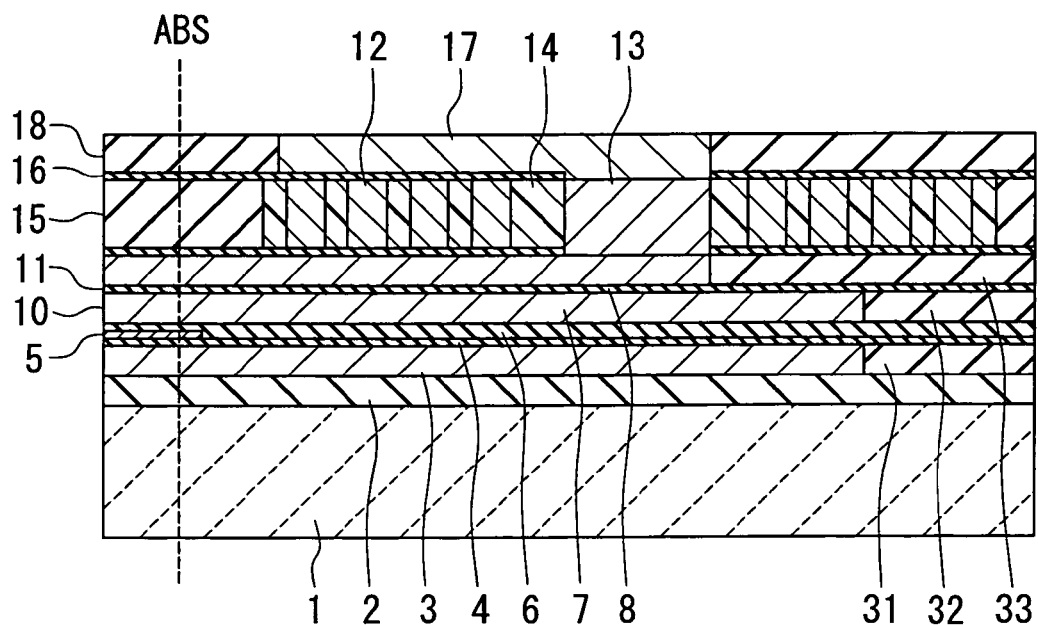
FIG. 9A and FIG. 9B are explanatory diagrams showing a step that follows the step of FIG. 8A and FIG. 8B.
Figure 9B:
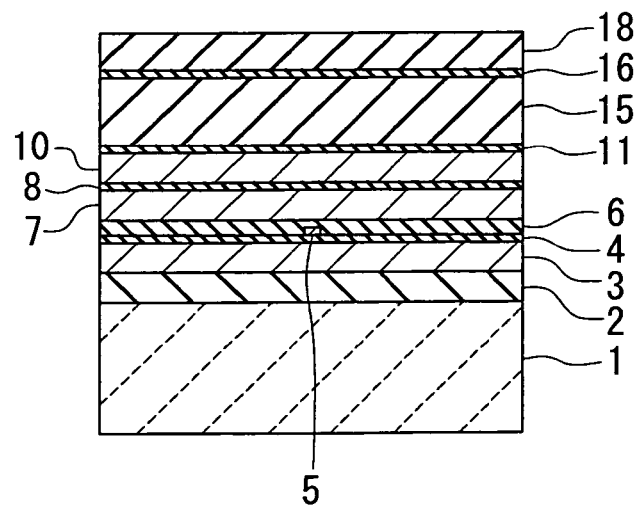

FIG. 9A and FIG. 9B show the next step. In this step, first, the bottom yoke layer 17 is formed over the coupling layer 13 and the insulating layer 16 by, for example, frame plating. Next, the nonmagnetic layer 18 is formed over the entire top surface of the stack. Next, the nonmagnetic layer 18 is polished by, for example, CMP until the bottom yoke layer 17 is exposed, whereby the bottom yoke layer 17 and the nonmagnetic layer 18 are flattened at the top.

Figure 10A:
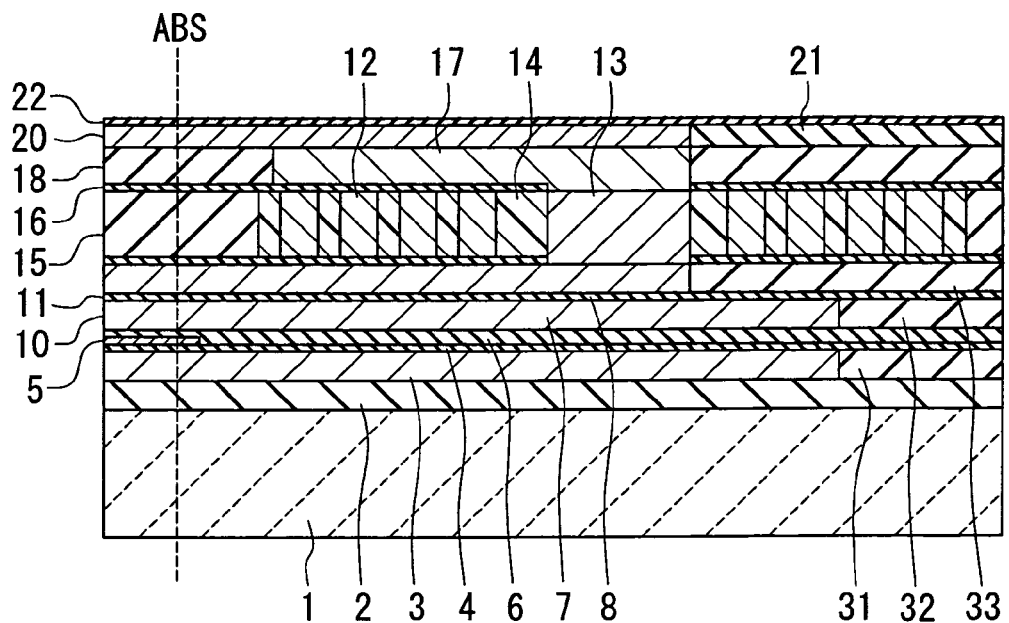
FIG. 10A and FIG. 10B are explanatory diagrams showing a step that follows the step of FIG. 9A and FIG. 9B.
Figure 10B:
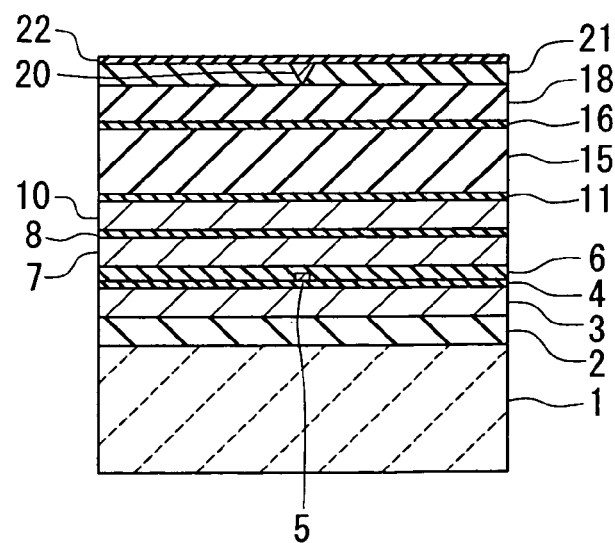

FIG. 10A and FIG. 10B show the next step. In this step, first, the nonmagnetic layer 21 is formed over the bottom yoke layer 17 and the nonmagnetic layer 18. Next, the nonmagnetic layer 21 is selectively etched to form therein a groove for accommodating the magnetic pole 20. Next, the magnetic pole 20 is formed by, for example, frame plating, such that the magnetic pole 20 is accommodated in the groove of the nonmagnetic layer 21. Next, the magnetic pole 20 and the nonmagnetic layer 21 are polished by, for example, CMP, whereby the magnetic pole 20 and the nonmagnetic layer 21 are flattened at the top. Next, the insulating layer 22 is formed over the magnetic pole 20 and the nonmagnetic layer 21.

Figure 11A:
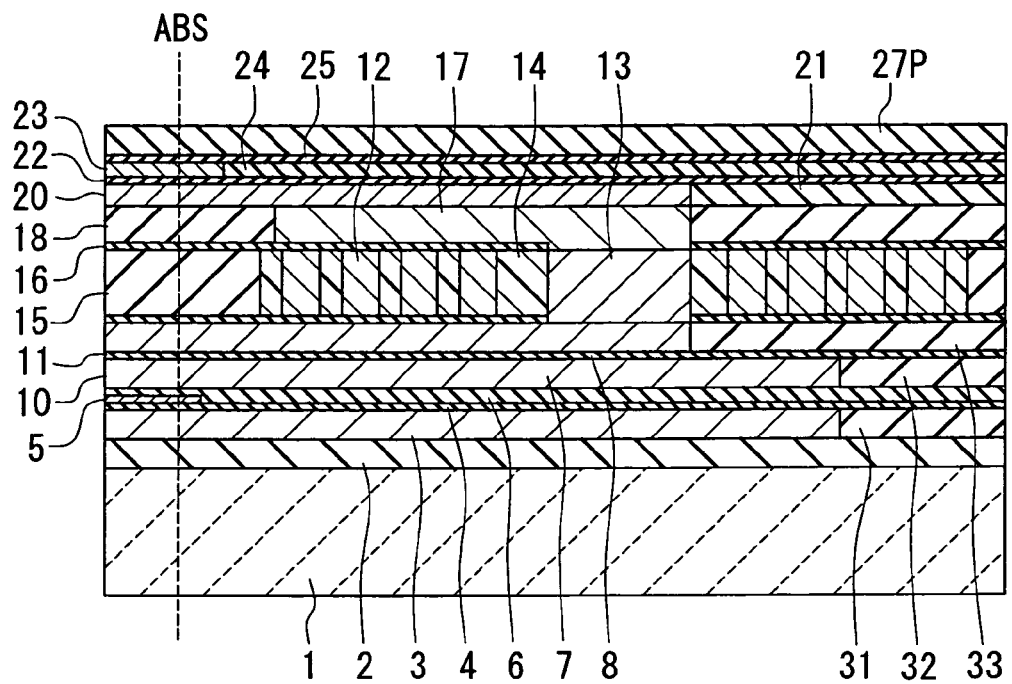
FIG. 11A and FIG. 11B are explanatory diagrams showing a step that follows the step of FIG. 10A and FIG. 10B.
Figure 11B:
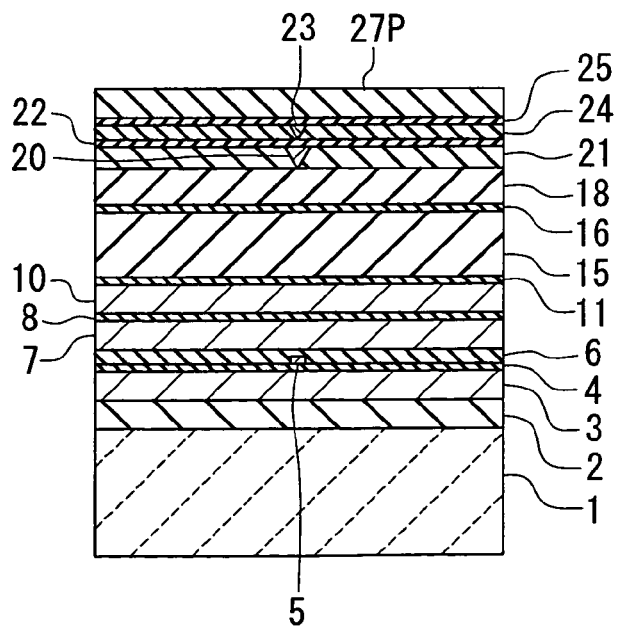

FIG. 11A and FIG. 11B show the next step. In this step, first, the insulating layer 24 is formed on the insulating layer 22. Next, the insulating layer 24 is selectively etched to form therein a groove for accommodating the near-field light generating element 23. Next, the near-field light generating element 23 is formed to be accommodated in the groove of the insulating layer 24. Next, the interposition layer 25 is formed over the near-field light generating element 23 and the insulating layer 24. Next, a dielectric layer 27P, which is to make the clad layer 27 later, is formed on the interposition layer 25. The steps of forming the near-field light generating element 23 and the interposition layer 25 will be described later in more detail.

Figure 12A:
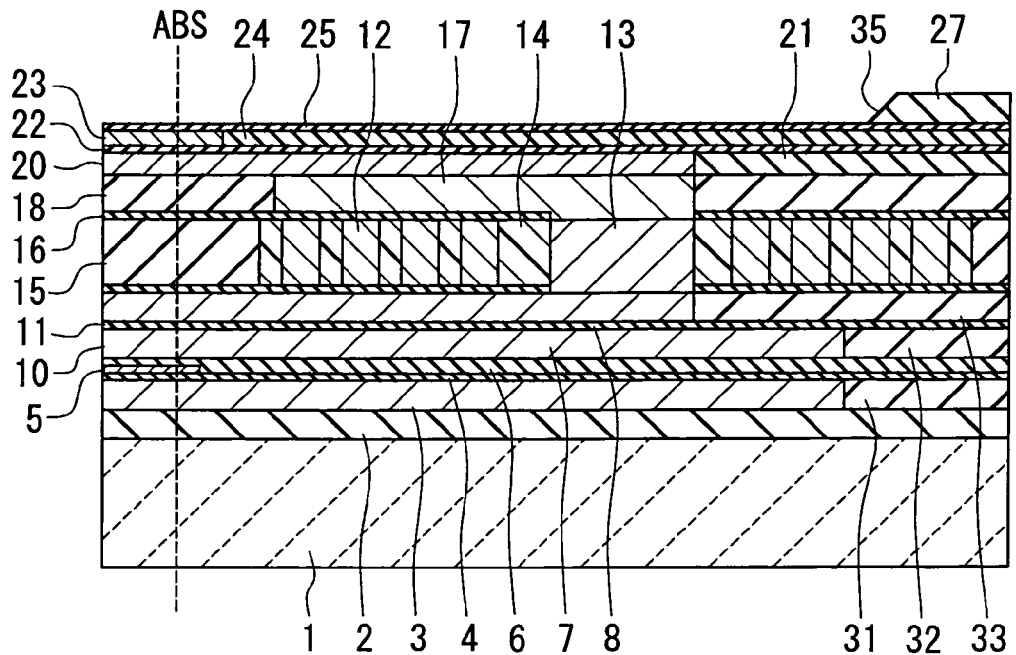
FIG. 12A and FIG. 12B are explanatory diagrams showing a step that follows the step of FIG. 11A and FIG. 11B.
Figure 12B:
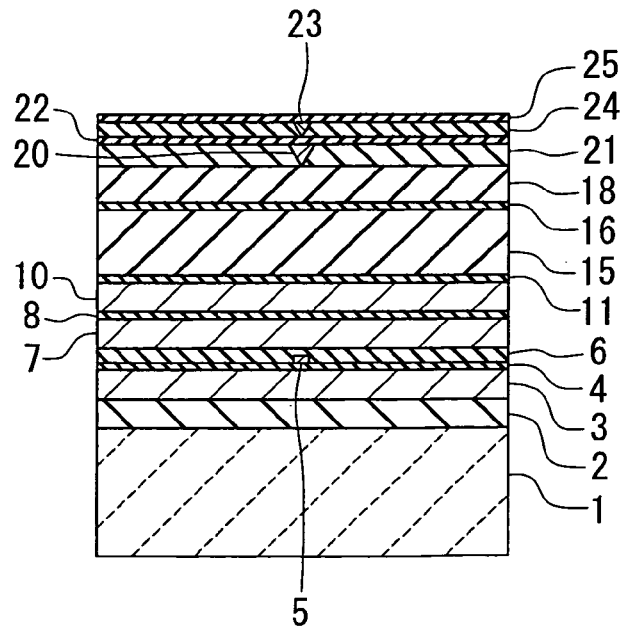

FIG. 12A and FIG. 12B show the next step. In this step, first, a metal mask (not shown) having a plane shape corresponding to that of the clad layer 27 is formed on the dielectric layer 27P. Next, the clad layer 27 is formed by selectively etching the dielectric layer 27P by, for example, reactive ion etching (hereinafter referred to as RIE). Here, the dielectric layer 27P is taper-etched so that the clad layer 27 will have an oblique surface for the mirror 35 to be formed thereon later. Next, the mirror 35 is formed on the oblique surface of the clad layer 27.

Figure 13A:
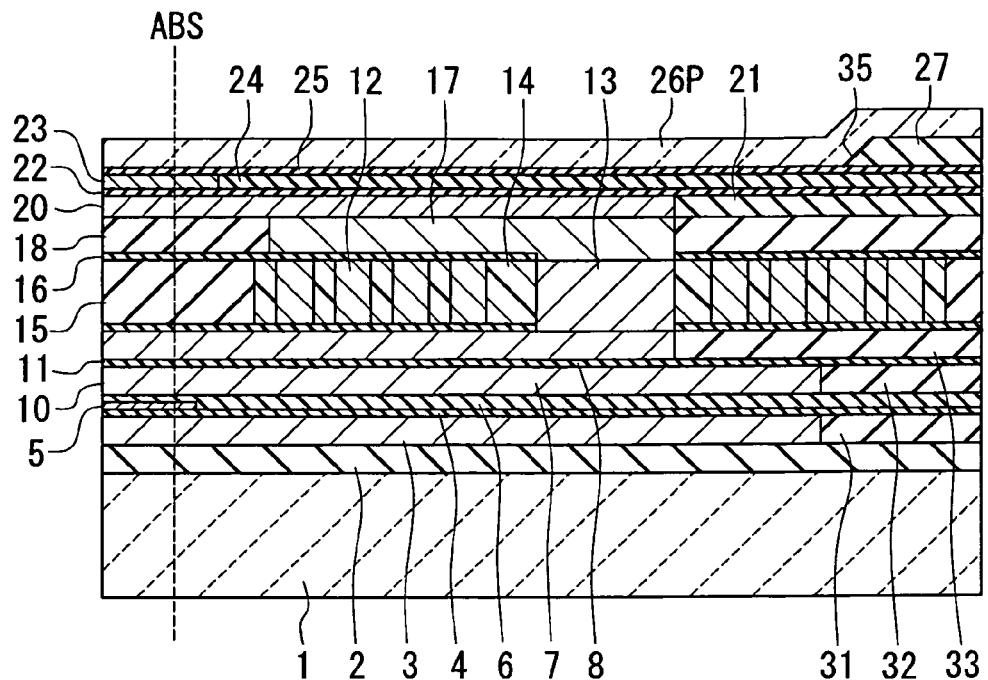
FIG. 13A and FIG. 13B are explanatory diagrams showing a step that follows the step of FIG. 12A and FIG. 12B.
Figure 13B:
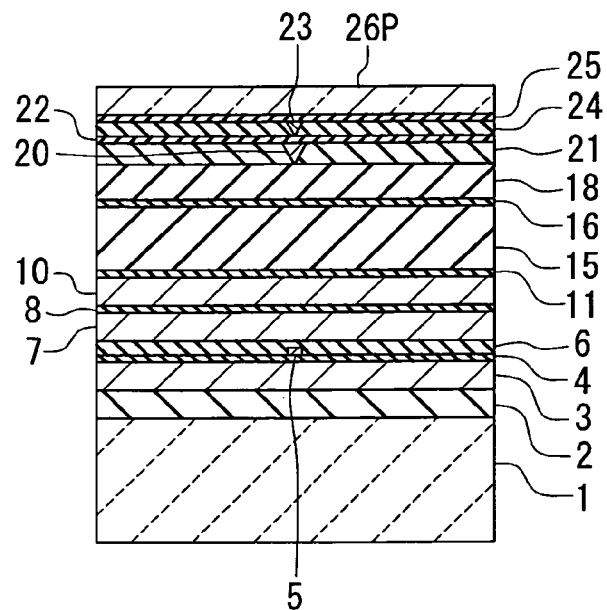

Next, as shown in FIG. 13A and FIG. 13B, a dielectric layer 26P, which is to make the waveguide 26 later, is formed over the entire top surface of the stack.

Figure 14A:
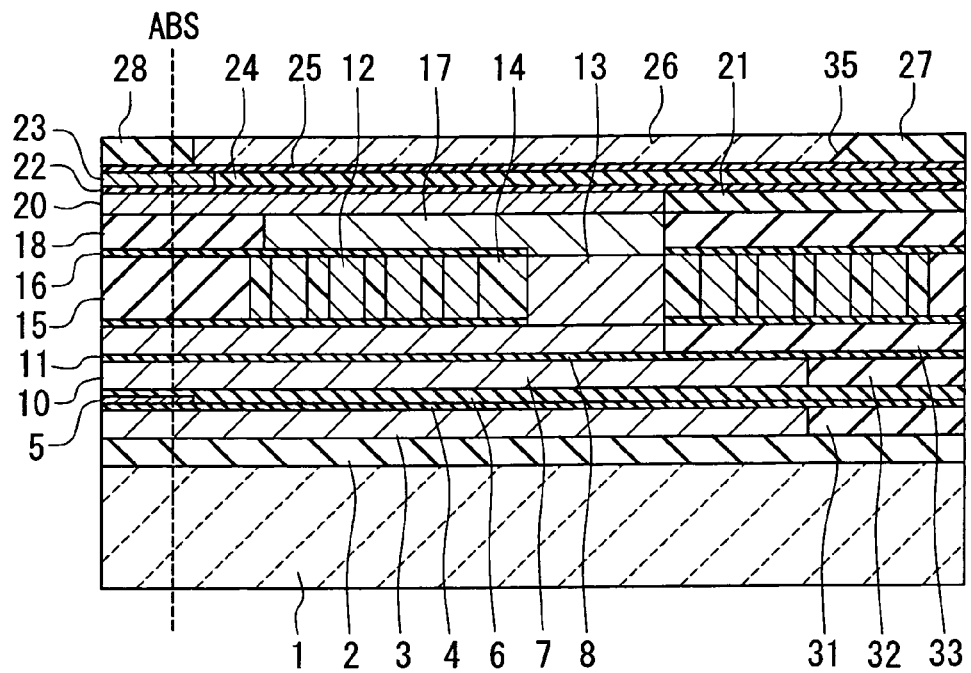
FIG. 14A and FIG. 14B are explanatory diagrams showing a step that follows the step of FIG. 13A and FIG. 13B.
Figure 14B:
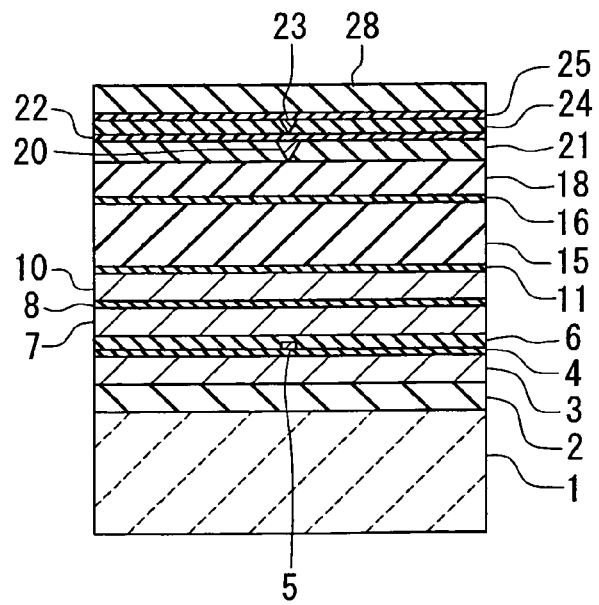

FIG. 14A and FIG. 14B show the next step. In this step, first, the waveguide 26 is formed by selectively etching the dielectric layer 26P by, for example, RIE. Next, a dielectric layer that is to make the clad layer 28 later is formed over the entire top surface of the stack. The dielectric layer is then polished by, for example, CMP until the waveguide 26 is exposed. The dielectric layer remaining after the polishing makes the clad layer 28. The polishing also flattens the waveguide 26 and the clad layers 27 and 28 at the top.

Figure 15A:
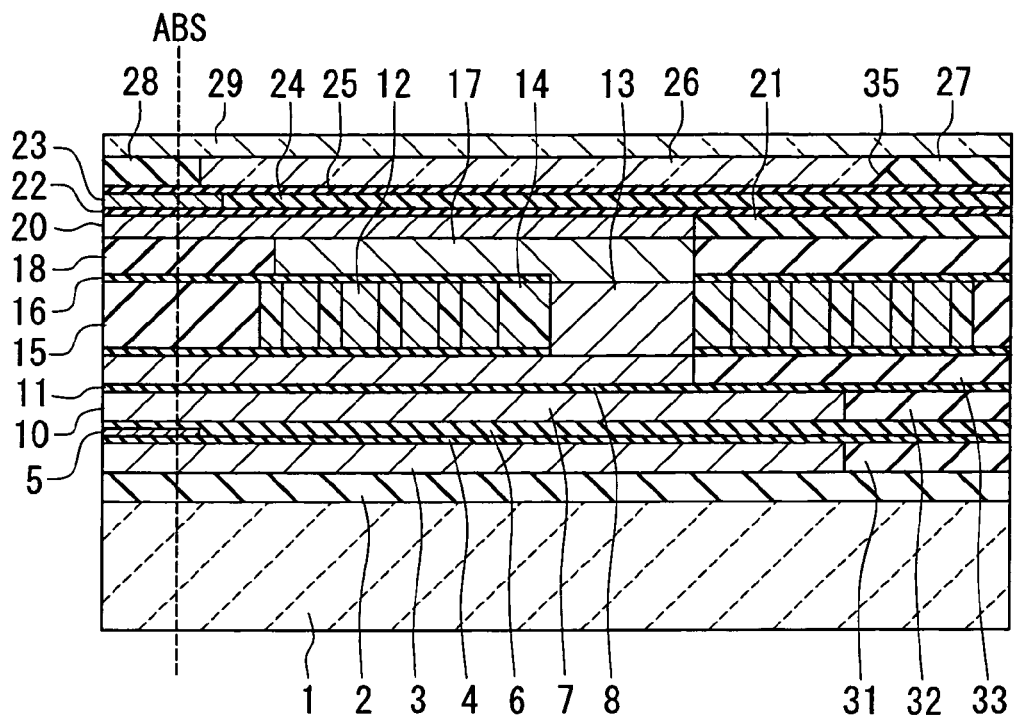
FIG. 15A and FIG. 15B are explanatory diagrams showing a step that follows the step of FIG. 14A and FIG. 14B.
Figure 15B:
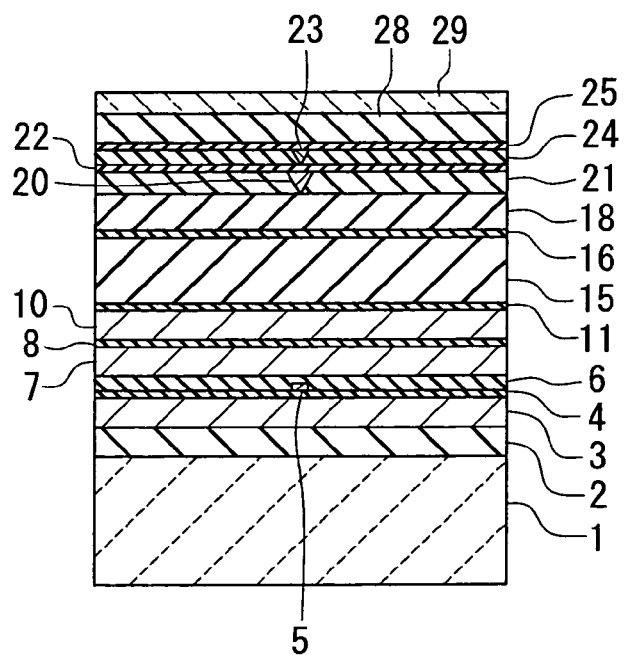
Figure 16A:
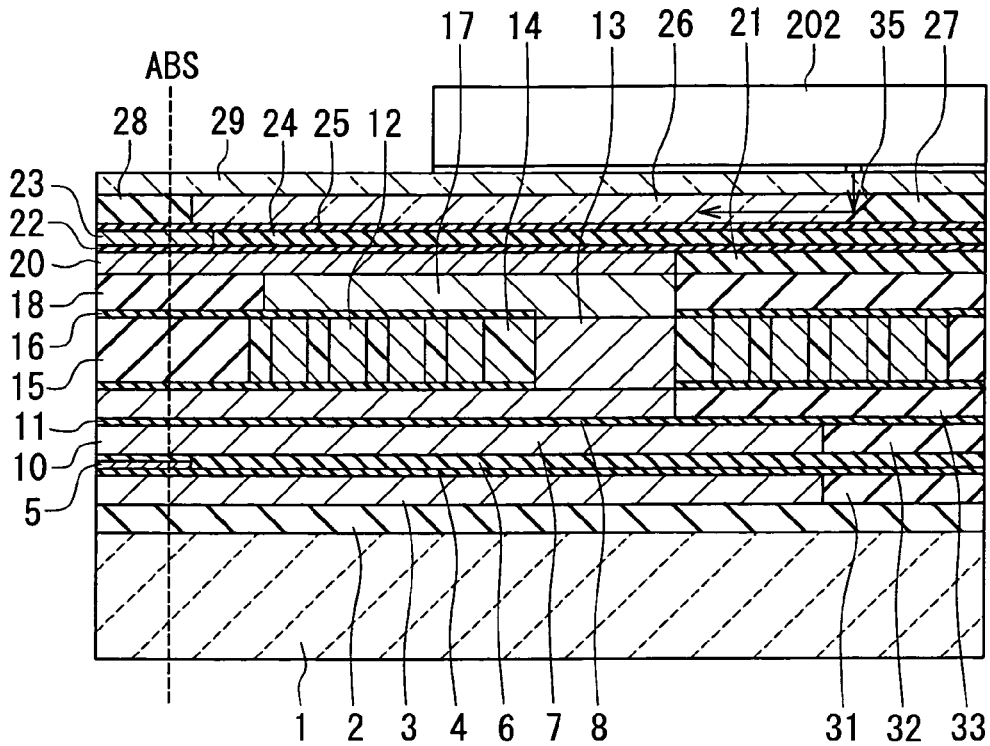
FIG. 16A and FIG. 16B are explanatory diagrams showing a step that follows the step of FIG. 15A and FIG. 15B.
Figure 16B:
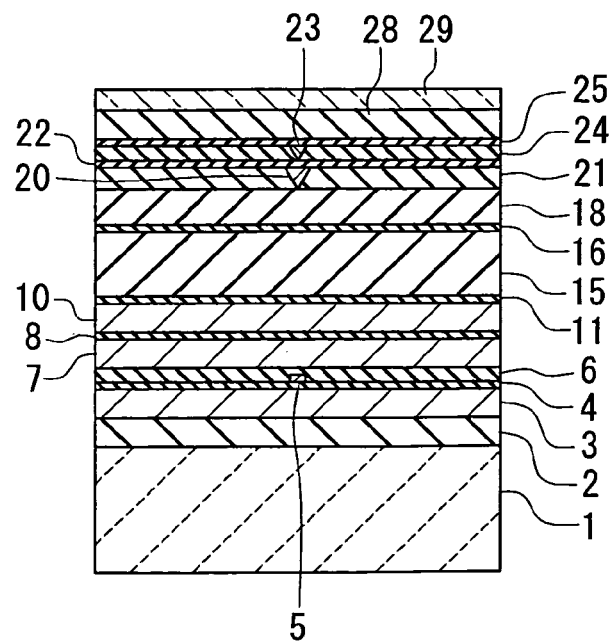

Next, as shown in FIG. 15A and FIG. 15B, the clad layer 29 is formed over the entire top surface of the stack. Next, as shown in FIG. 16A and FIG. 16B, the laser diode 202 is fixed to the top surface of the clad layer 29 with an adhesive, for example.

Next, wiring, terminals and so on are formed on the top surface of the clad layer 29, the substrate is cut into sliders, and polishing of the medium facing surface 30, fabrication of flying rails, etc. are performed to thereby complete the heat-assisted magnetic recording head.

Now, a series of steps for forming the near-field light generating element 23 and the interposition layer 25 will be described in detail with reference to FIG. 17 to FIG. 21. FIG. 17 to FIG. 21 each show a cross section of part of the stack of layers formed in the process of manufacturing the heat-assisted magnetic recording head, the cross section being taken at the position ABS where the medium facing surface 30 is to be formed. Note that the portions closer to the substrate 1 than the insulating layer 24 are omitted in FIG. 17 to FIG. 21.

Figure 17:
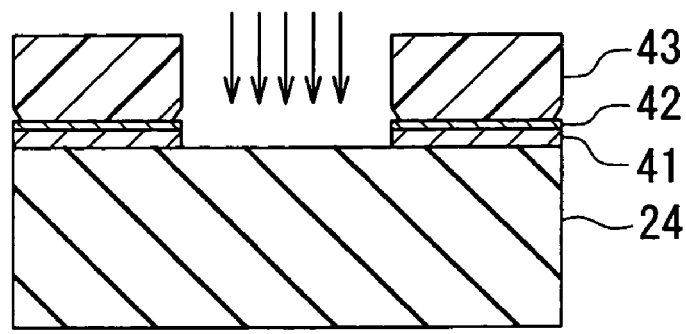
FIG. 17 is a cross-sectional view showing a step in a series of steps for forming the near-field light generating element and an interposition layer of the first embodiment of the present invention.

FIG. 17 shows the step after the insulating layer 24 is formed on the insulating layer 22 shown in FIG. 10A and FIG. 10B. In this step, first and second metal layers are initially formed in succession on the insulating layer 24. The first metal layer is made of Ru with a thickness of 50 nm, for example. The second metal layer is made of NiCr with a thickness of 5 to 10 nm, for example. Next, a photoresist mask 43 is formed on the second metal layer. The photoresist mask 43 has an opening having a plane shape corresponding to that of the near-field light generating element 23. Next, the first and second metal layers except the respective portions lying under the photoresist mask 43 are removed by, for example, ion beam etching. The remaining first metal layer makes a first mask layer 41. The remaining second metal layer makes a second mask layer 42. Each of the mask layers 41 and 42 has an opening having a plane shape corresponding to that of the near-field light generating element 23.

Figure 18:
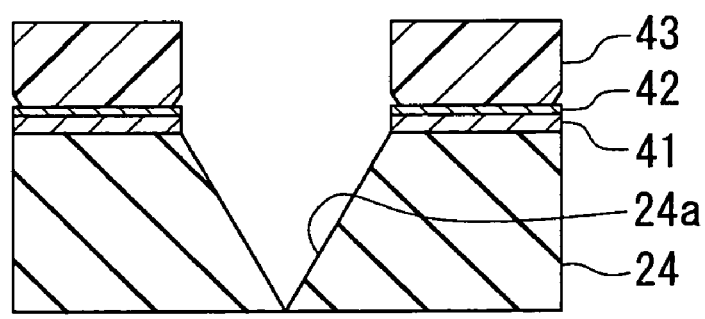
FIG. 18 is a cross-sectional view showing a step that follows the step of FIG. 17.

FIG. 18 shows the next step. In this step, the portion of the insulating layer 24 exposed from the openings of the mask layers 41 and 42 and the photoresist mask 43 is taper-etched by, for example, RIE, whereby a groove 24a for accommodating the near-field light generating element 23 is formed in the insulating layer 24. The groove 24a is V-shaped in a cross section parallel to the medium facing surface 30.

Figure 19:
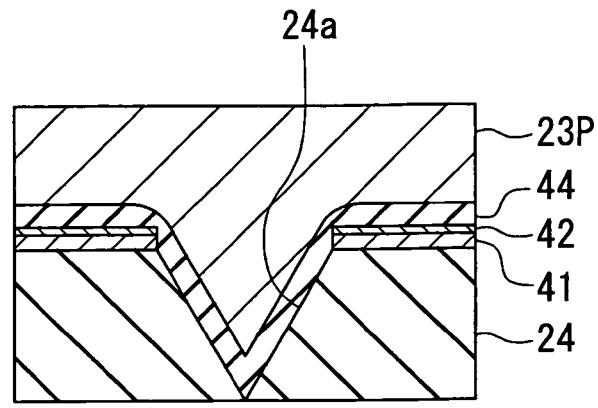
FIG. 19 is a cross-sectional view showing a step that follows the step of FIG. 18.

FIG. 19 shows the next step. In this step, first, an insulating film 44 is formed over the entire top surface of the stack by, for example, atomic layer deposition (ALD) in which deposition of a single atomic layer is repeated. A part of the insulating film 44 is formed in the groove 24a. The insulating film 44 has a thickness of 50 to 200 nm, for example. The insulating film 44 is formed of alumina, for example. Next, a metal film 23P, which is to make the near-field light generating element 23 later, is formed on the insulating film 44 by sputtering, for example. A part of the metal film 23P is formed in the groove 24a.

Figure 20:
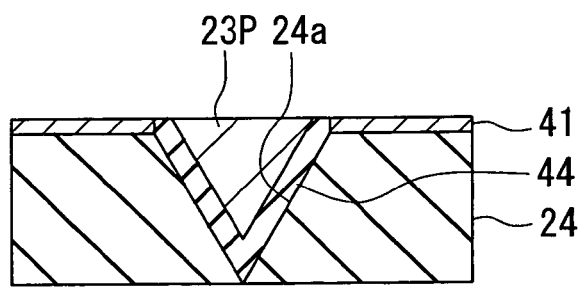
FIG. 20 is a cross-sectional view showing a step that follows the step of FIG. 19.

FIG. 20 shows the next step. In this step, the metal film 23P and the second mask layer 42 are polished by, for example, CMP until the first mask layer 41 is exposed, whereby the first mask layer 41, the insulating film 44 and the metal film 23P are flattened at the top. In this polishing process, the first mask layer 41 functions as a polishing stopper for stopping the polishing.

Figure 21:
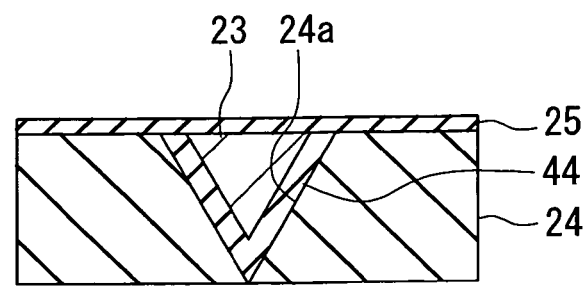
FIG. 21 is a cross-sectional view showing a step that follows the step of FIG. 20.

FIG. 21 shows the next step. In this step, first, a part of the metal film 23P, a part of the insulating film 44, and the first mask layer 41 are etched by, for example, ion beam etching until the top surface of the insulating layer 24 is exposed, whereby the metal film 23P, the insulating film 44 and the insulating layer 24 are flattened at the top. The resulting metal film 23P makes the near-field light generating element 23. Next, the interposition layer 25 is formed over the near-field light generating element 23, the insulating film 44 and the insulating layer 24 by sputtering, for example.

As has been described, in the heat-assisted magnetic recording head according to the present embodiment, the opposed portion 26g of the outer surface of the waveguide 26 is opposed to a part of the top surface 23c of the near-field light generating element 23 with the interposition layer 25 interposed therebetween. In the present embodiment, evanescent light occurs from the interposition layer 25 based on the light propagating through the waveguide 26. Based on this evanescent light, surface plasmons are excited on the near-field light generating element 23. The surface plasmons then propagate to the near-field light generating part 23f, and the near-field light generating part 23f generates near-field light based on the surface plasmons. According to the present embodiment, it is possible to increase the efficiency of conversion of the light propagating through the waveguide 26 into the near-field light, as compared with the case where a plasmon antenna is directly irradiated with laser light to produce near-field light.

According to the present embodiment, it is possible suppress a temperature rise of the near-field light generating element 23 because the near-field light generating element 23 is not directly irradiated with the laser light propagating through the waveguide 26. In the present embodiment, the length $H_{P4}$ of the near-field light generating element 23 in the direction perpendicular to the medium facing surface 30 is greater than the length $T_{P4}$ of the first end face 23a in the direction perpendicular to the top surface 1a of the substrate 1. Thus, the near-field light generating element 23 according to the present embodiment is greater in volume than a conventional plasmon antenna in which the length in the direction perpendicular to the medium facing surface 30 is smaller than the length in the direction perpendicular to the top surface 1a of the substrate 1. This also contributes to suppression of a temperature rise of the near-field light generating element 23. Consequently, according to the present embodiment, it is possible to prevent the near-field light generating element 23 from protruding from the medium facing surface 30.

In the heat-assisted magnetic recording head according to the present embodiment, the near-field light generating element 23 and the waveguide 26 are disposed farther from the top surface 1a of the substrate 1 than is the magnetic pole 20, and the light emitted from the laser diode 202 disposed above the waveguide 26 is reflected by the mirror 35 so as to travel through the waveguide 26 toward the medium facing surface 30.

A case will now be considered where a near-field light generating element and a waveguide are disposed closer to the top surface 1a of the surface 1 than is the magnetic pole 20, i.e., in a positional relationship reverse to that of the near-field light generating element 23 and the waveguide 26 with the magnetic pole 20 according to the present embodiment. In this case, since the magnetic pole 20 lies above the near-field light generating element and the waveguide, the optical path from the laser diode to the waveguide becomes longer and the energy loss of the light increases if the laser diode is disposed above the waveguide as in the present embodiment. The longer optical path from the laser diode to the waveguide also makes it harder to precisely position the laser diode and the waveguide, thus often resulting in energy loss of the light due to misalignment between the laser diode and the waveguide.

In contrast, the present embodiment allows shortening the optical path from the laser diode 202 to the waveguide 26, thus making it possible to guide the light from the laser diode 202 to the opposed portion 26g of the outer surface of the waveguide 26 through a shorter path. According to the present embodiment, it is therefore possible to reduce the energy loss of the light. Furthermore, the present embodiment allows the laser diode 202 and the waveguide 26 to be put close to each other, which facilitates precise positioning of the laser diode 202 and the waveguide 26. Consequently, according to the present embodiment, it is possible to reduce the energy loss of the light resulting from misalignment between the laser diode 202 and the waveguide 26.

In the present embodiment, the clad layer 29 having a refractive index lower than that of the waveguide 26 is disposed between the emission part 202a of the laser diode 202 and the waveguide 26. Light that is incident on the interface between the waveguide 26 and the clad layer 29 from the side of the waveguide 26 at incident angles greater than or equal to the critical angle is thus totally reflected at the interface. This can prevent the laser light that is emitted from the laser diode 202 to pass through the clad layer 29 and enter the waveguide 26 from passing through the clad layer 29 again to return to the laser diode 202. Consequently, according to the present embodiment, it is possible to increase the use efficiency of the laser light and to prevent the laser diode 202 from being damaged by laser light that returns to the laser diode 202.

From the foregoing, the present embodiment makes it possible to increase the use efficiency of the light used for generating near-field light in the heat-assisted magnetic recording head.

MODIFICATION EXAMPLES

Figure 22:
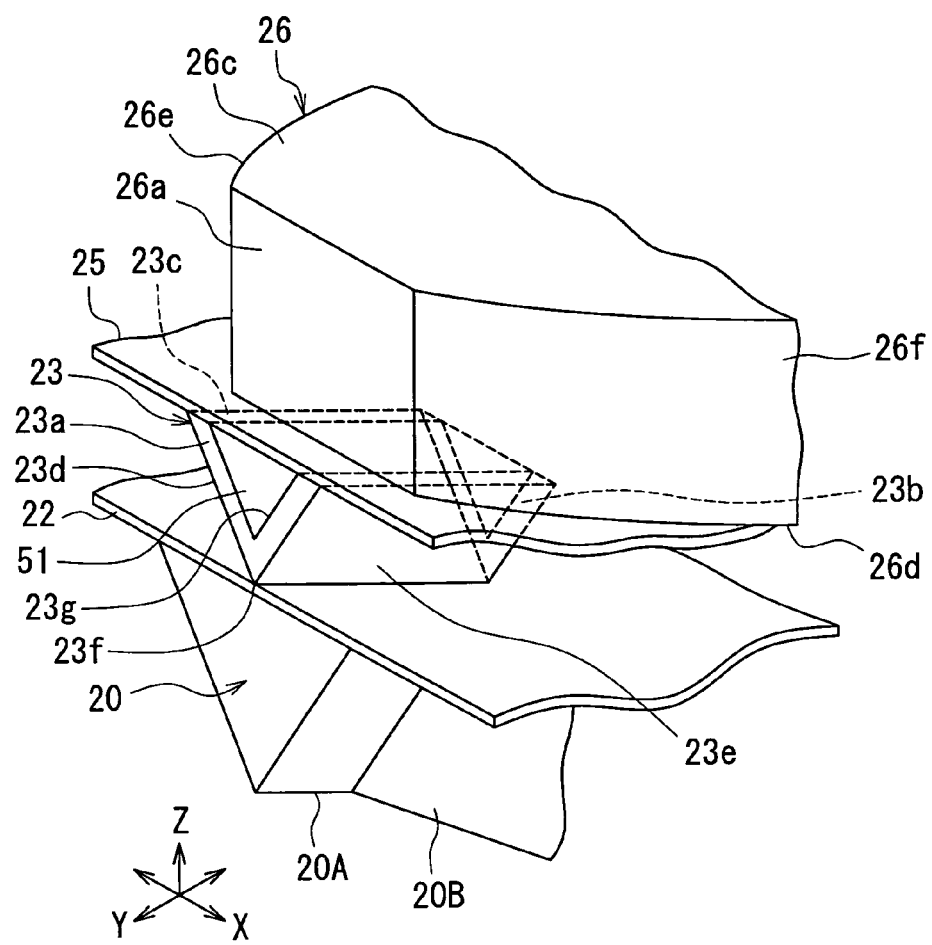
FIG. 22 is a perspective view showing the neighborhood of a near-field light generating element of a heat-assisted magnetic recording head according to a first modification example of the first embodiment of the present invention.

Hereinafter, first and second modification examples of the present embodiment will be described. FIG. 22 is a perspective view showing the neighborhood of the near-field light generating element 23 of a heat-assisted magnetic recording head according to the first modification example. In the first modification example, the near-field light generating element 23 has a groove 23g that opens in the top surface 23c. The groove 23g is V-shaped in a cross section parallel to the medium facing surface 30. The first and second end faces 23a and 23b of the near-field light generating element 23 are also V-shaped accordingly. The heat-assisted magnetic recording head of the first modification example further has a dielectric layer 51 disposed in the groove 23g. The dielectric layer 51 is made of the same material as that of the waveguide 26, for example. The near-field light generating element 23, the dielectric layer 51 and the insulating layer 24 are flattened at the top. The interposition layer 25 is disposed over the top surfaces of the near-field light generating element 23, the dielectric layer 51 and the insulating layer 24.

In the near-field light generating element 23 shown in FIG. 4, the top surface 23c has two edges that extend in the direction perpendicular to the medium facing surface 30 and where surface plasmons concentrate. On the other hand, in the near-field light generating element 23 of the first modification example, the top surface 23c has four edges that extend in the direction perpendicular to the medium facing surface 30 and where surface plasmons concentrate. According to the first modification example, the top surface 23c of the near-field light generating element 23 thus has a greater number of edges that extend in the direction perpendicular to the medium facing surface 30 and where surface plasmons concentrate. This makes it possible to concentrate surface plasmons with high efficiency to let them propagate to the near-field light generating part 23f.

Figure 23:
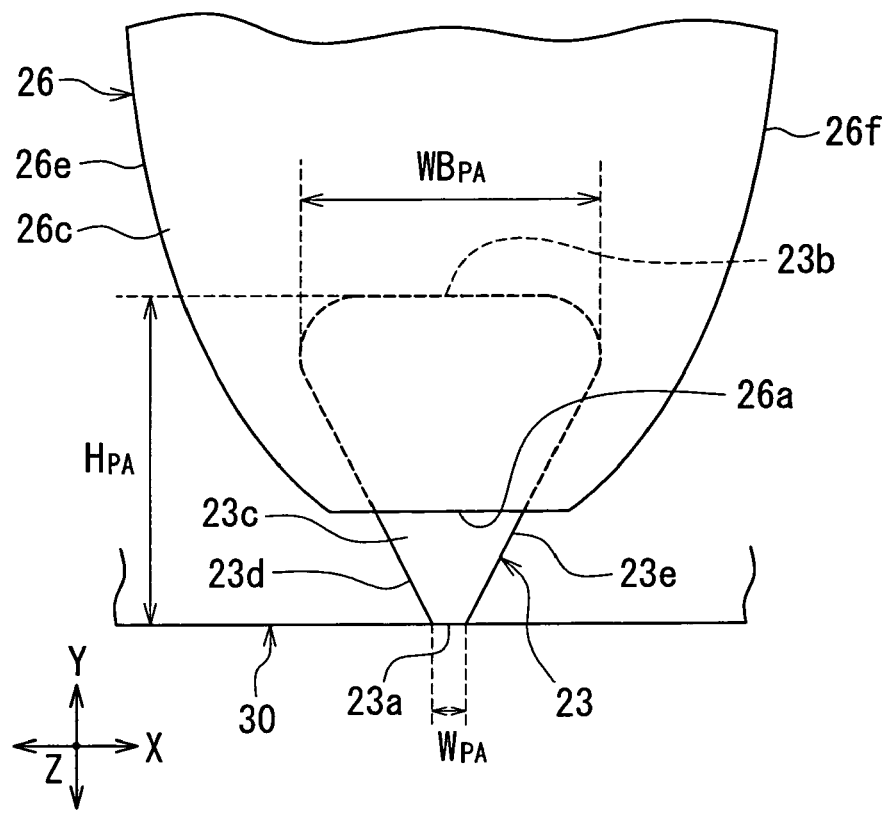
FIG. 23 is a plan view showing a part of a waveguide and a near-field light generating element of a heat-assisted magnetic recording head according to a second modification example of the first embodiment of the present invention.
Figure 24:
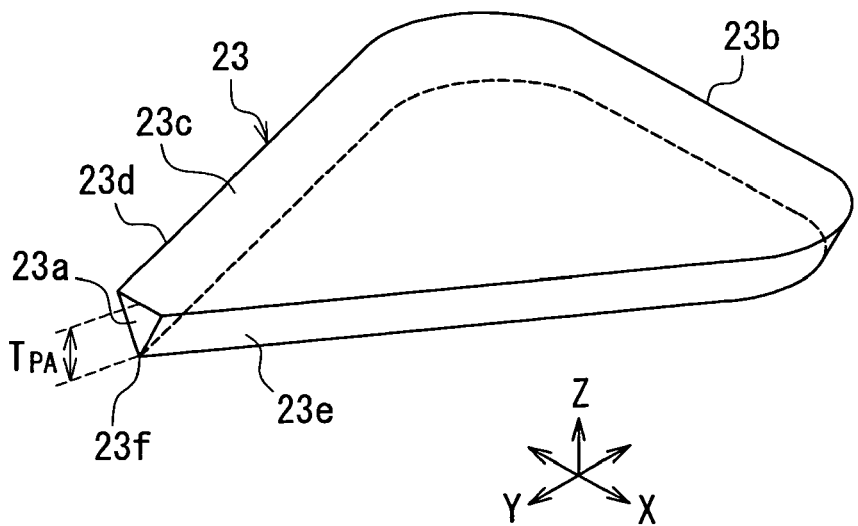
FIG. 24 is a perspective view of the near-field light generating element of FIG. 23.

FIG. 23 is a plan view showing a part of the waveguide 26 and the near-field light generating element 23 of a heat-assisted magnetic recording head according to the second modification example. FIG. 24 is a perspective view of the near-field light generating element 23 of FIG. 23. In the near-field light generating element 23 according to the second modification example, the distance between the two side surfaces 23d and 23e in the track width direction increases with increasing distance from the medium facing surface 30. Furthermore, in the near-field light generating element 23 according to the second modification example, the corner between the side surface 23d and the second end face 23b and the corner between the side surface 23e and the second end face 23b are both rounded. A part of the bottom surface 26d of the waveguide 26 is opposed to a part of the top surface 23c of the near-field light generating element 23 with the interposition layer 25 interposed therebetween. FIG. 23 shows an example in which the front end face 26a of the waveguide 26 is located away from the medium facing surface 30. However, the front end face 26a may be located in the medium facing surface 30.

As shown in FIG. 23, the length of the near-field light generating element 23 in the direction perpendicular to the medium facing surface 30 will be denoted by the symbol $H_{P4}$; the width the first end face 23a at its top edge will be denoted by the symbol $W_{P4}$; and the maximum width of the near-field light generating element 23 in the track width direction (the X direction) will be denoted by the symbol $WB_{P4}$. As shown in FIG. 24, the length of the first end face 23a in the direction perpendicular to the top surface 1a of the substrate 1 will be denoted by the symbol $T_{P4}$. The length $H_{P4}$ of the near-field light generating element 23 in the direction perpendicular to the medium facing surface 30 is greater than the length $T_{P4}$ of the first end face 23a in the direction perpendicular to the top surface 1a of the substrate 1. $W_{P4}$ falls within the range of 50 to 150 nm, for example. $T_{P4}$ falls within the range of 50 to 150 nm, for example. $H_{P4}$ falls within the range of 0.25 to 2.5 μm, for example. $WB_{P4}$ falls within the range of 0.25 to 2.5 μm, for example.

The second modification example allows an increase in area of the opposed portion of the waveguide 26 opposed to a part of the top surface 23c of the near-field light generating element 23. This makes it possible to excite a greater amount of surface plasmons on the top surface 23c of the near-field light generating element 23. In the second modification example, the corner between the side surface 23d and the second end face 23b and the corner between the side surface 23e and the second end face 23b are both rounded. This makes it possible to prevent near-field light from occurring from these corners. Consequently, according to the second modification example, it is possible to further increase the use efficiency of the light used for generation of near-field light in the near-field light generating part 23f.

Second Embodiment

Figure 25:
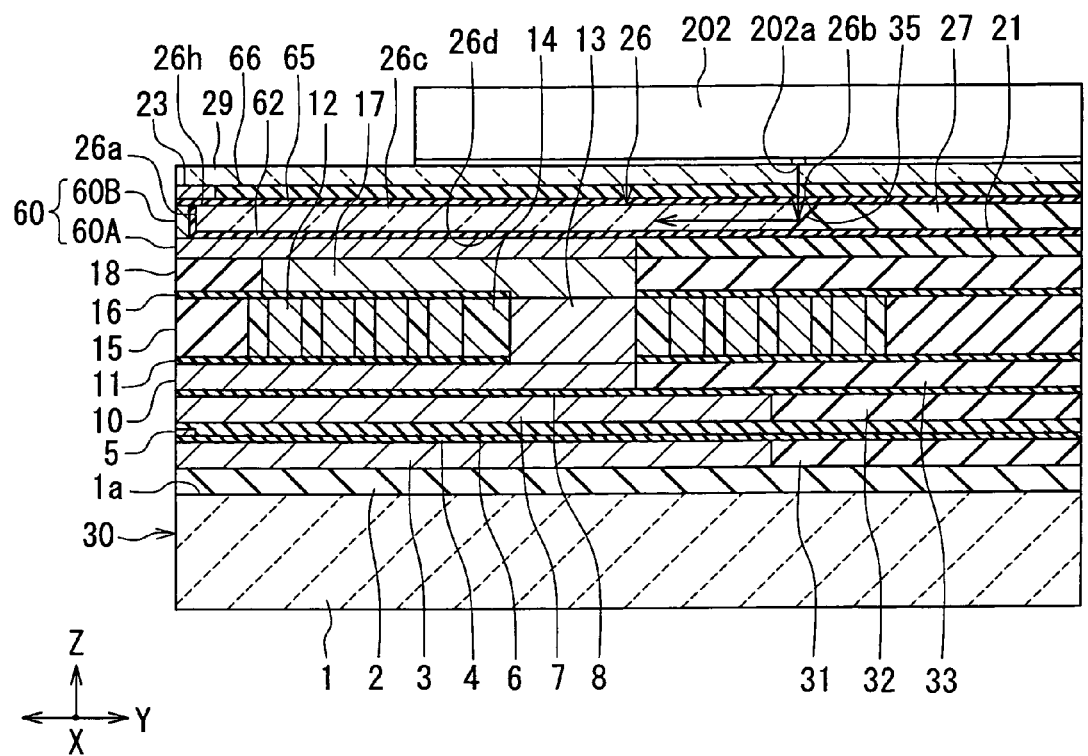
FIG. 25 is a cross-sectional view showing the configuration of a heat-assisted magnetic recording head according to a second embodiment of the present invention.

A heat-assisted magnetic recording head according to a second embodiment of the present invention will now be described with reference to FIG. 25. FIG. 25 is a cross-sectional view showing the configuration of the heat-assisted magnetic recording head according to the present embodiment. FIG. 25 shows a cross section perpendicular to the medium facing surface and the top surface of the substrate.

The heat-assisted magnetic recording head according to the present embodiment has a magnetic pole 60 instead of the magnetic pole 20 of the first embodiment. The magnetic pole 60 includes a first layer 60A and a second layer 60B. The first layer 60A and the second layer 60B are made of the same material as that of the magnetic pole 20 of the first embodiment. The first layer 60A lies over the bottom yoke layer 17 and the nonmagnetic layer 18. The first layer 60A has an end face located in the medium facing surface 30. This end face has a rectangular shape, for example.

The nonmagnetic layer 21 is disposed around the first layer 60A on the nonmagnetic layer 18. The second layer 60B lies on the first layer 60A near the medium facing surface 30. The second layer 60B has a front end face located in the medium facing surface 30, and a rear end face opposite to the front end face. The front end face of the second layer 60B has a rectangular shape, for example.

The position of the end of a bit pattern to be recorded on the recording medium depends on the position of the top edge, i.e., the edge farther from the top surface 1a of the substrate 1, of the front end face of the second layer 60B. The width of the front end face of the second layer 60B at the top edge defines the track width.

The width of the end face of the first layer 60A located in the medium facing surface 30 may be equal to or greater than the width of the front end face of the second layer 60B.

The heat-assisted magnetic recording head according to the present embodiment has a clad layer 62 instead of the insulating layer 22, the insulating layer 24 and the interposition layer 25 of the first embodiment. The clad layer 62 is disposed to cover the top surfaces of the first layer 60A and the nonmagnetic layer 21 around the second layer 60B, and the rear end face of the second layer 60B. The clad layer 62 is made of a dielectric material having a refractive index lower than that of the waveguide 26.

In the present embodiment, the waveguide 26, the clad layer 27 and the mirror 35 are disposed on the clad layer 62. The front end face 26a of the waveguide 26 is opposed to the rear end face of the second layer 60B with the clad layer 62 interposed therebetween. The second layer 60B, the clad layer 62, the waveguide 26 and the clad layer 27 are flattened at the top.

The heat-assisted magnetic recording head according to the present embodiment further has an interposition layer 65 disposed over the top surfaces of the second layer 60B, the clad layer 62, the waveguide 26 and the clad layer 27. The material and thickness of the interposition layer 65 are the same as those of the interposition layer 25 of the first embodiment.

In the present embodiment, the near-field light generating element 23 is disposed on the interposition layer 65. The shape of the near-field light generating element 23 may be any of the ones shown in FIG. 4, FIG. 22 and FIG. 24. The heat-assisted magnetic recording head according to the present embodiment-further has a clad layer 66 disposed around the near-field light generating element 23 on the interposition layer 65. The near-field light generating element 23 and the clad layer 66 are flattened at the top. The clad layer 66 is made of a dielectric material that has a refractive index lower than that of the waveguide 26 and transmits later light.

In the present embodiment, the clad layer 29 is disposed over the top surfaces of the near-field light generating element 23 and the clad layer 66. As in the first embodiment, the laser diode 202 is fixed to the top surface of the clad layer 29 with an adhesive, for example.

For example, if the waveguide 26 is made of $Ta_2O_5$ which has a refractive index of approximately 2.1, the clad layers 27, 29, 62 and 66 and the interposition layer 65 may be made of alumina which has a refractive index of approximately 1.8.

In the present embodiment, the waveguide 26 is disposed closer to the top surface 1a of the substrate 1 than is the near-field light generating element 23. The outer surface of the waveguide 26 includes an opposed portion 26h that is opposed to a part of the coupling portion of the outer surface of the near-field light generating element 23. In the present embodiment, a part of the top surface 26c of the waveguide 26 is opposed to a part of the lower end of the near-field light generating element 23 with the interposition layer 65 interposed therebetween. This part of the top surface 26c of the waveguide 26 opposed to the part of the above-mentioned lower end is the opposed portion 26h.

In the present embodiment, laser light emitted from the emission part 202a of the laser diode 202 passes through the clad layers 29 and 66 and the interposition layer 65, enters the waveguide 26 from the top surface 26c and reaches the rear end face 26b, where the laser light is reflected by the mirror 35 so as to travel through the waveguide 26 toward the medium facing surface 30 (the front end face 26a). This laser light propagates through the waveguide 26 to reach the vicinity of the opposed portion 26h. The laser light is then totally reflected at the interface between the opposed portion 26h and the interposition layer 65, and this generates evanescent light permeating into the interposition layer 65. As a result, the evanescent light and the collective oscillations of charges on the lower end of the near-field light generating element 23, i.e., surface plasmons, are coupled with each other to excite a system of surface plasmon polaritons. In this way, surface plasmons are excited on the near-field light generating element 23.

The surface plasmons excited on the near-field light generating element 23 propagate along the lower end of the near-field light generating element 23 toward the near-field light generating part 23f. Consequently, the surface plasmons concentrate on the near-field light generating part 23f, and the near-field light generating part 23f generates near-field light based on the surface plasmons.

The remainder of configuration, function and effects of the present embodiment are similar to those of the first embodiment.

The present invention is not limited to the foregoing embodiments but can be carried out in various modifications. For example, the near-field light generating element 23 may have any other shapes than those shown in FIG. 4, FIG. 22 and FIG. 24.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A heat-assisted magnetic recording head comprising:
   a medium facing surface that faces a recording medium;
   a magnetic pole having an end face located in the medium facing surface, the magnetic pole being configured to produce a recording magnetic field for recording data on the recording medium;
   a waveguide that allows light to propagate therethrough;
   a near-field light generating element having a near-field light generating part located in the medium facing surface, the near-field light generating element being configured so that a surface plasmon is excited on the near-field light generating element based on the light propagating through the waveguide, the surface plasmon propagates to the near-field light generating part, and the near-field light generating part generates near-field light based on the surface plasmon;
   a substrate on which the magnetic pole, the near-field light generating element and the waveguide are stacked; and
   a mirror that is configured to reflect light emitted from a light source disposed above the waveguide, so as to let the light travel through the waveguide toward the medium facing surface; wherein
   the substrate has a top surface facing toward the magnetic pole, the near-field light generating element and the waveguide;
   the near-field light generating element and the waveguide are disposed closer to the light source than is the magnetic pole;
   the near-field light generating element has an outer surface, the outer surface including: a first end face located in the medium facing surface; a second end face farther from the medium facing surface; and a coupling portion that couples the first end face and the second end face to each other, the first end face including the near-field light generating part;
   a length of the near-field light generating element in a direction perpendicular to the medium facing surface is greater than a length of the first end face in a direction perpendicular to the top surface of the substrate; and
   the waveguide has an outer surface including an opposed portion that is opposed to a part of the coupling portion.

2. The heat-assisted magnetic recording head according to claim 1, wherein:
   the outer surface of the waveguide has a front end face closer to the medium facing surface, a rear end face farther from the medium facing surface, and a top surface farther from the top surface of the substrate;
   a distance between the medium facing surface and an arbitrary point on the rear end face increases with increasing distance between the arbitrary point and the top surface of the substrate; and
   the mirror is in contact with the rear end face of the waveguide, and reflects light that enters the waveguide from the top surface of the waveguide and reaches the rear end face, so as to let the light travel toward the front end face.

3. The heat-assisted magnetic recording head according to claim 2, further comprising a laser diode as the light source, the laser diode being fixed to the waveguide and emitting the light.

4. The heat-assisted magnetic recording head according to claim 3, further comprising a clad layer that has a refractive index lower than that of the waveguide and is interposed between the laser diode and the top surface of the waveguide.

5. The heat-assisted magnetic recording head according to claim 1, further comprising an interposition layer that has a refractive index lower than that of the waveguide and is interposed between the opposed portion and the near-field light generating element.

6. The heat-assisted magnetic recording head according to claim 1, wherein the waveguide is disposed closer to the light source than is the near-field light generating element.

7. The heat-assisted magnetic recording head according to claim 1, wherein the waveguide is disposed farther from the light source than is the near-field light generating element.

8. The heat-assisted magnetic recording head according to claim 1, wherein the coupling portion includes two side surfaces that decrease in distance from each other toward the top surface of the substrate.

9. The heat-assisted magnetic recording head according to claim 1, wherein the first end face has a triangular shape.

10. The heat-assisted magnetic recording head according to claim 1, wherein the first end face has a V shape.

* * * * *